March 29, 1949.　　　　C. W. NORTON　　　　2,465,657
TYPING AND JUSTIFYING MACHINE
Filed Nov. 19, 1945　　　　　　　　　　　　18 Sheets-Sheet 1
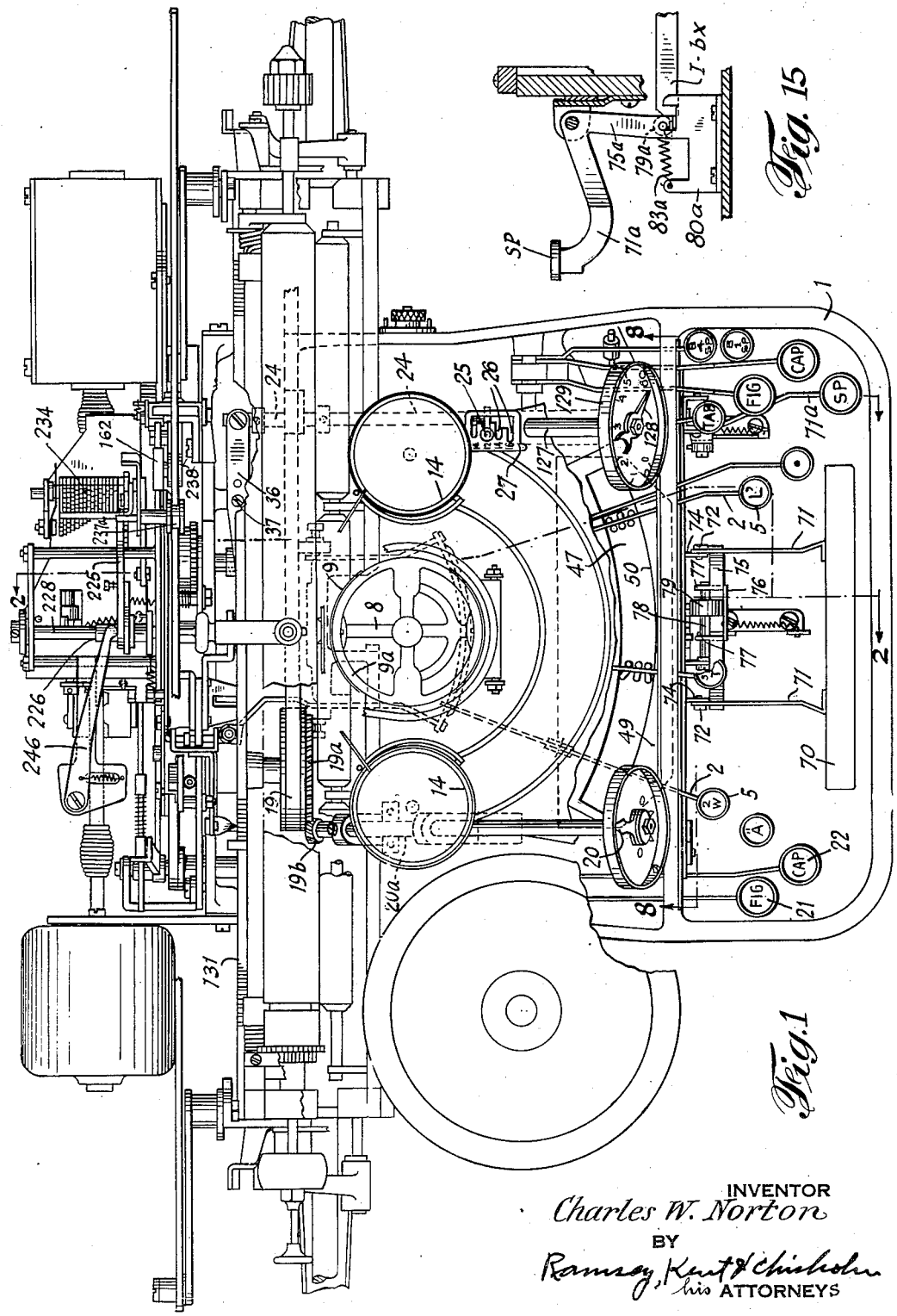
INVENTOR
Charles W. Norton
BY
Ramsey, Kent & Chisholm
his ATTORNEYS March 29, 1949.    C. W. NORTON    2,465,657
TYPING AND JUSTIFYING MACHINE
Filed Nov. 19, 1945    18 Sheets-Sheet 2
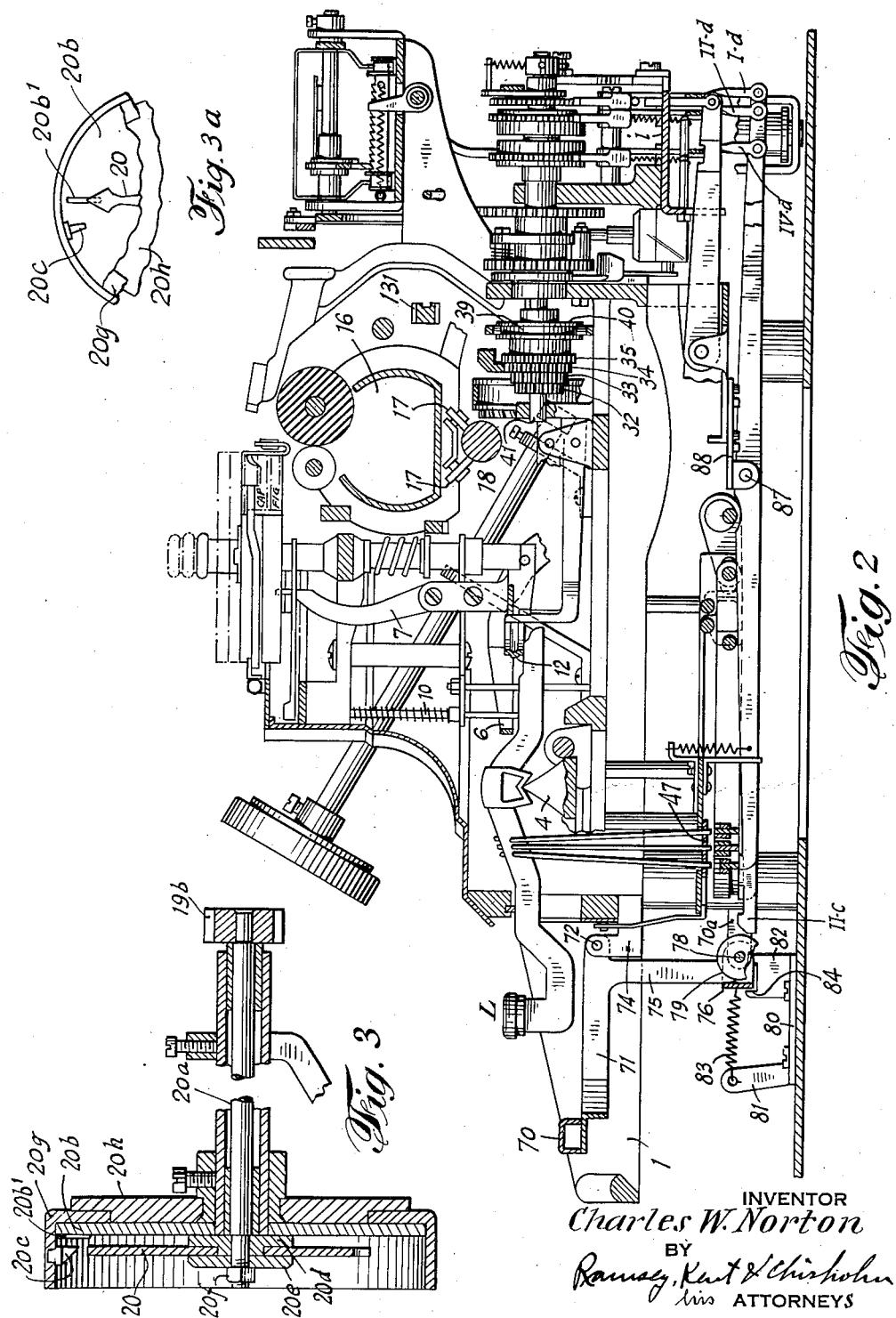
INVENTOR
Charles W. Norton
BY
Ramsey, Kant & Chisholm
his ATTORNEYS March 29, 1949.  C. W. NORTON  2,465,657
TYPING AND JUSTIFYING MACHINE
Filed Nov. 19, 1945    18 Sheets-Sheet 3
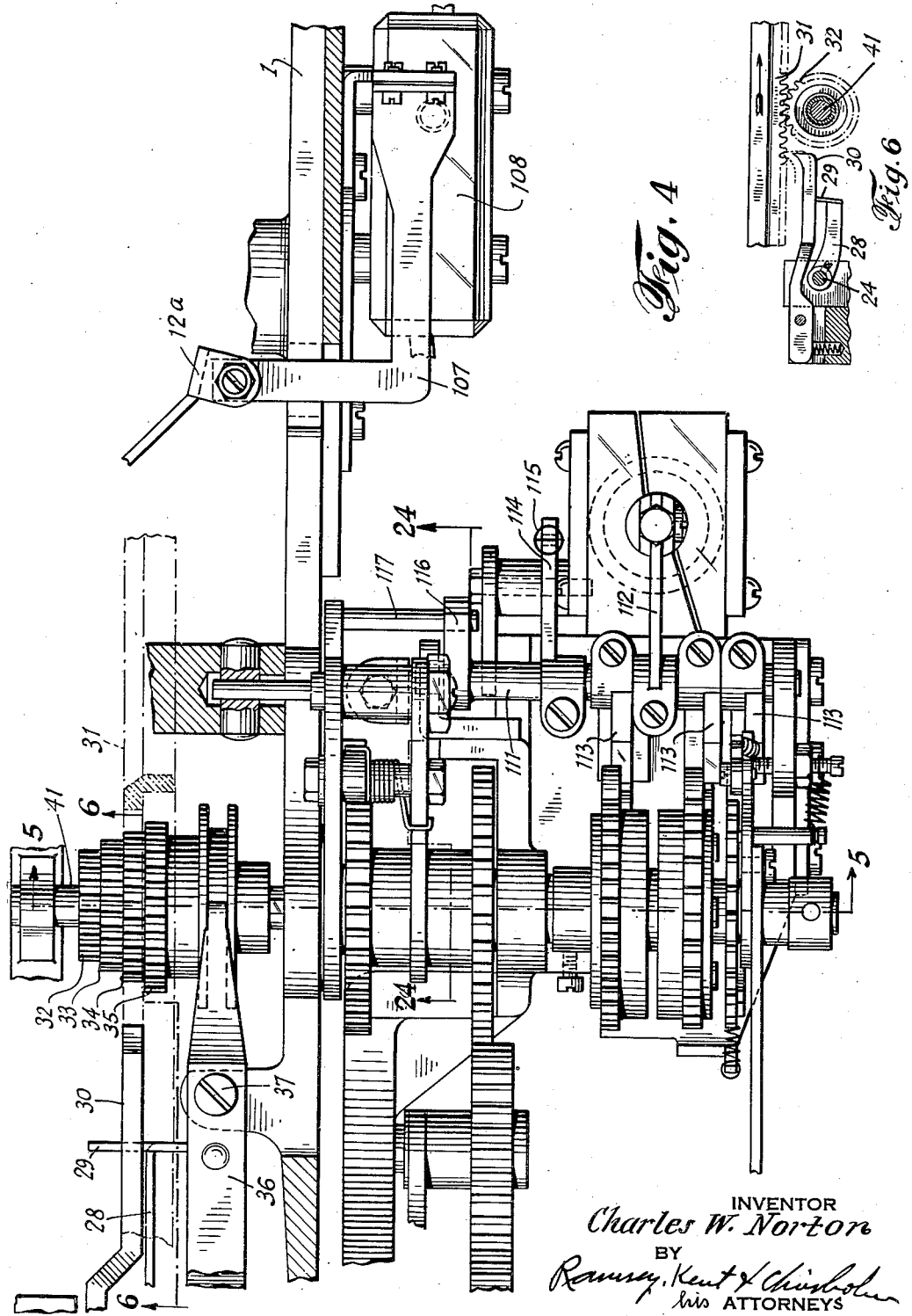

March 29, 1949.   C. W. NORTON   2,465,657
TYPING AND JUSTIFYING MACHINE
Filed Nov. 19, 1945   18 Sheets-Sheet 4

INVENTOR
Charles W. Norton
BY
Ramsey, Kent & Chisholm
his ATTORNEYS

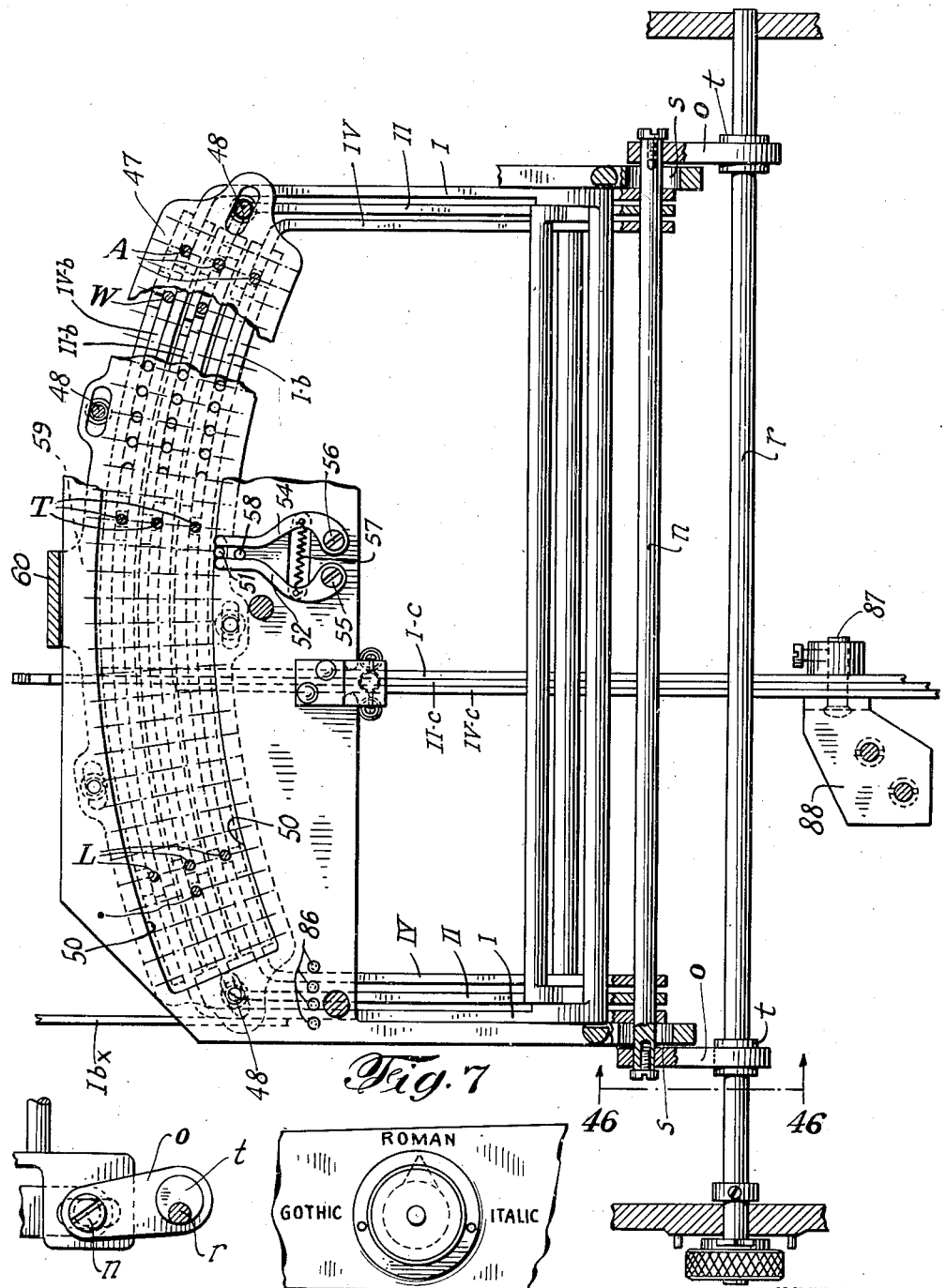

March 29, 1949. C. W. NORTON 2,465,657
TYPING AND JUSTIFYING MACHINE
Filed Nov. 19, 1945 18 Sheets-Sheet 6

INVENTOR
Charles W. Norton
BY
Ramsey, Kent & Chisholm
his ATTORNEYS

| ROMAN LETTERS ||||
|---|---|---|---|
| LETTER | UNITS SMALL / CAPS | FIG'S | UNITS |
| A | 5 / 6 | " | 2 |
| B | 5 / 6 | C | 4 |
| C | 4 / 6 | ¾ | 7 |
| D | 5 / 6 | $ | 4 |
| E | 4 / 5 | 3 | 4 |
| F | 3 / 5 | % | 7 |
| G | 5 / 7 | — | 6 |
| H | 5 / 6 | & | 7 |
| I | 3 / 4 | 8 | 4 |
| J | 3 / 4 | ' | 2 |
| K | 5 / 6 | ( | 4 |
| L | 3 / 5 | ) | 4 |
| M | 7 / 7 | ? | 4 |
| N | 5 / 6 | * | 4 |
| O | 4 / 6 | 9 | 4 |
| P | 5 / 5 | 0 | 4 |
| Q | 5 / 6 | 1 | 4 |
| R | 4 / 6 | 4 | 4 |
| S | 4 / 5 | fl | 5 |
| T | 3 / 6 | 5 | 4 |
| U | 5 / 6 | 7 | 4 |
| V | 5 / 6 | ff | 6 |
| W | 7 / 7 | 2 | 4 |
| X | 5 / 6 | ¼ | 7 |
| Y | 5 / 6 | 6 | 4 |
| Z | 4 / 5 | fi | 5 |
| . | 2 / 2 | . | 2 |
| , | 2 / 2 | , | 2 |
| ; | 2 / : 2 | ½ | 7 |
| - | 4 / ! 2 | / | 5 |

Fig. 9

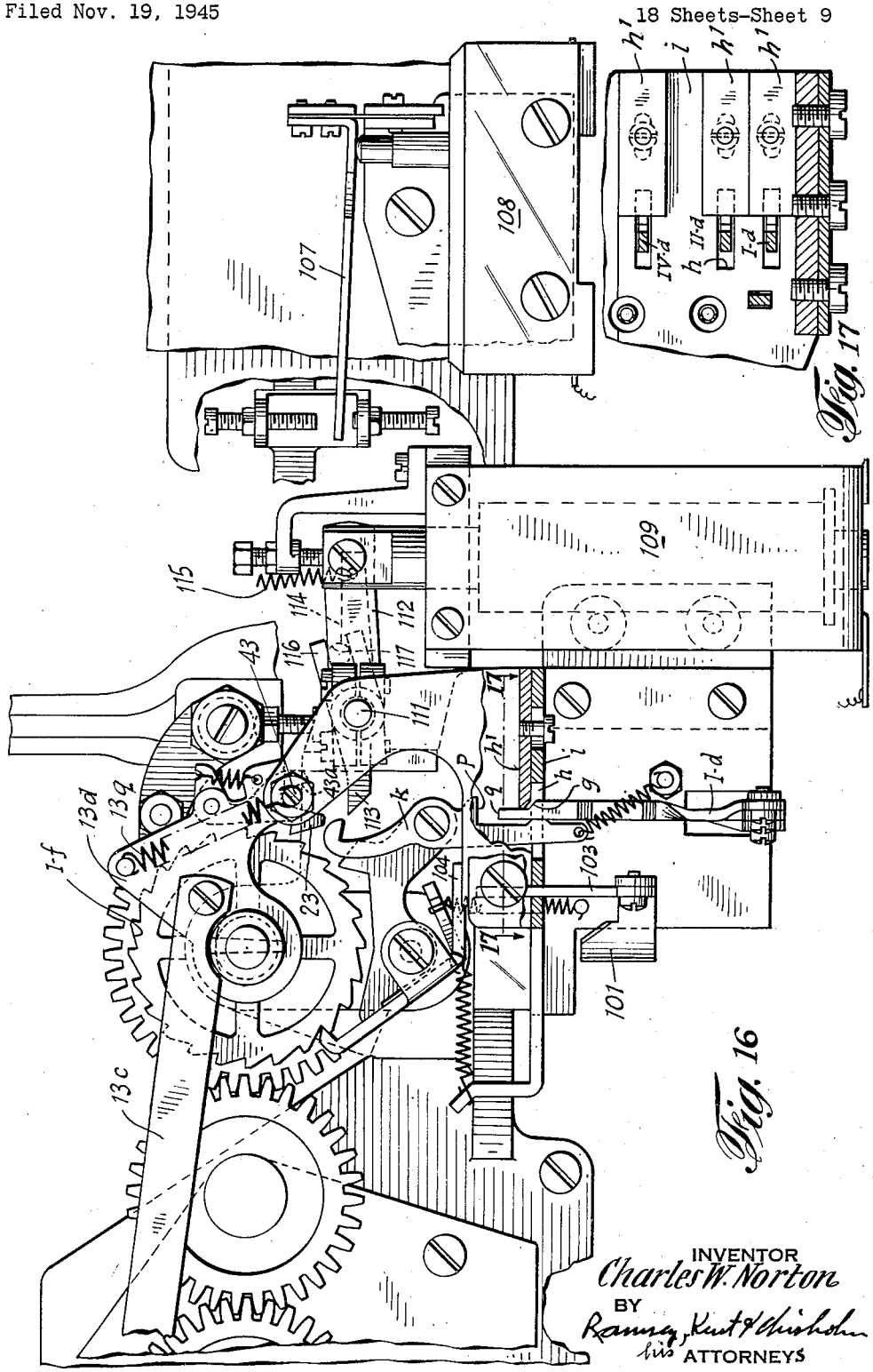

March 29, 1949.     C. W. NORTON     2,465,657
TYPING AND JUSTIFYING MACHINE

Filed Nov. 19, 1945     18 Sheets-Sheet 10

INVENTOR
Charles W. Norton
BY
Ramsey, Kent & Chisholm
his ATTORNEYS

March 29, 1949.　　　　　C. W. NORTON　　　　　2,465,657
TYPING AND JUSTIFYING MACHINE
Filed Nov. 19, 1945　　　　　　　　　　　　　　　18 Sheets-Sheet 11
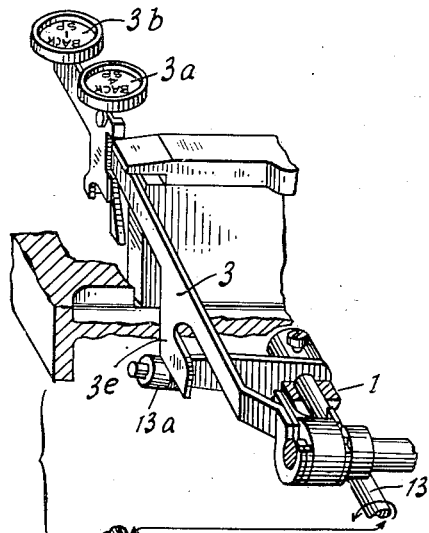
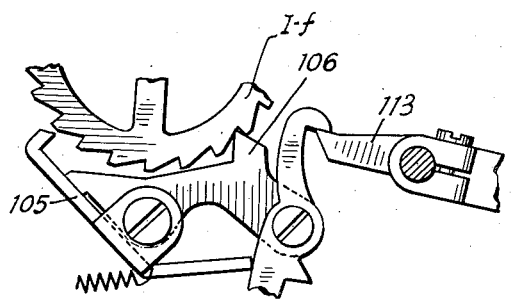
Fig. 21
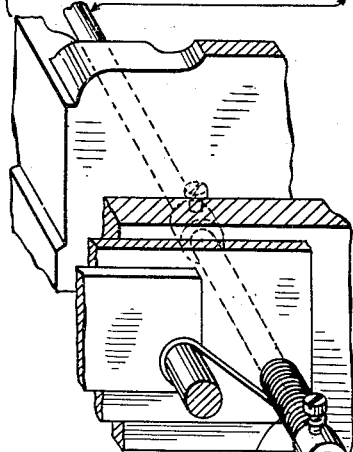
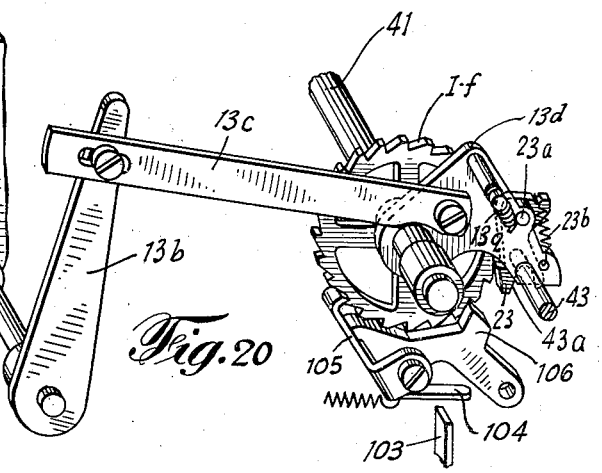
Fig. 20
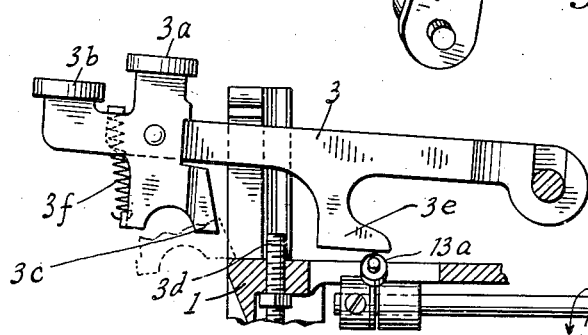
Fig. 19
INVENTOR
Charles W. Norton
BY
Ramsey, Kent & Chisholm
his ATTORNEYS

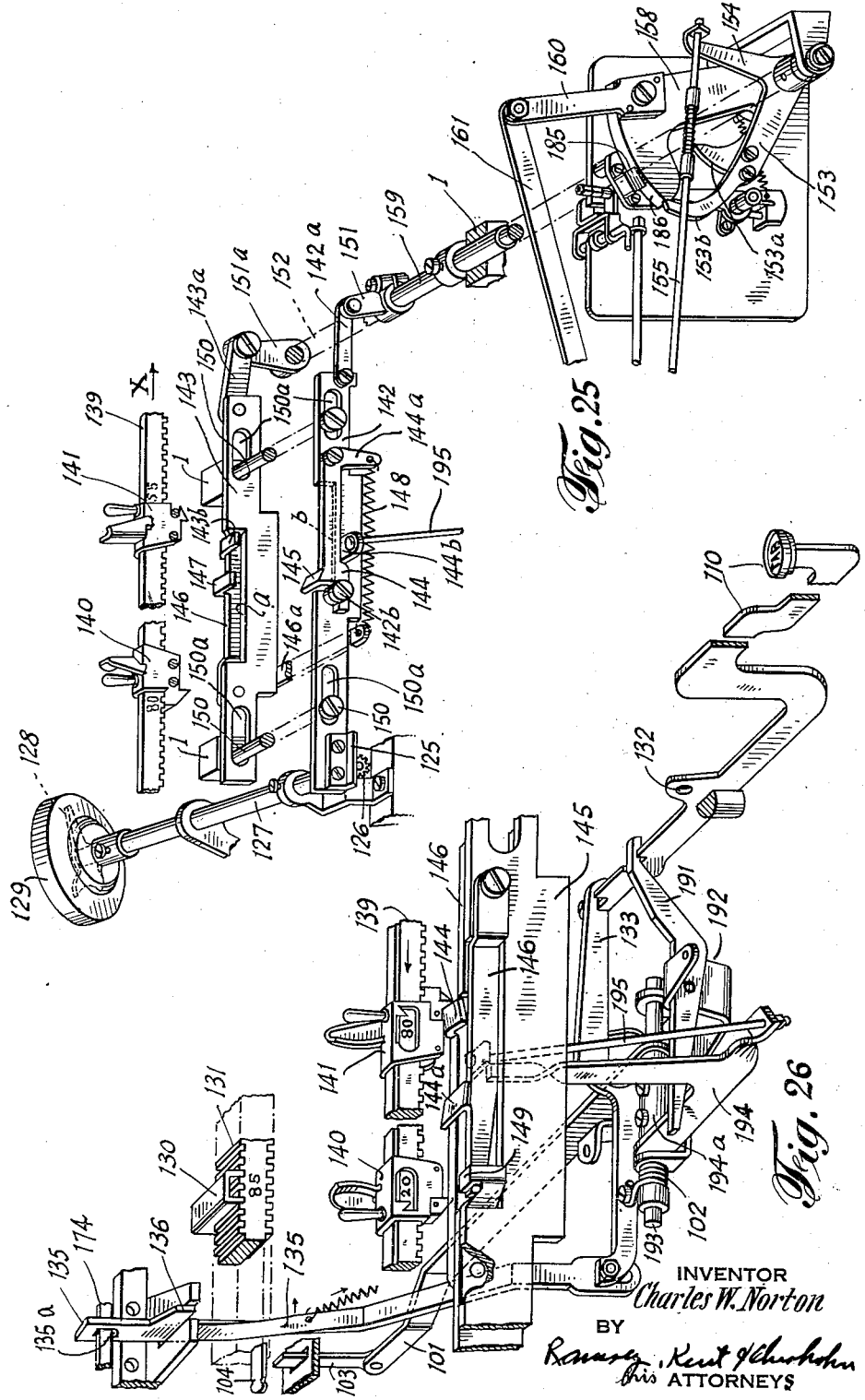

March 29, 1949. C. W. NORTON 2,465,657
TYPING AND JUSTIFYING MACHINE
Filed Nov. 19, 1945 18 Sheets-Sheet 13
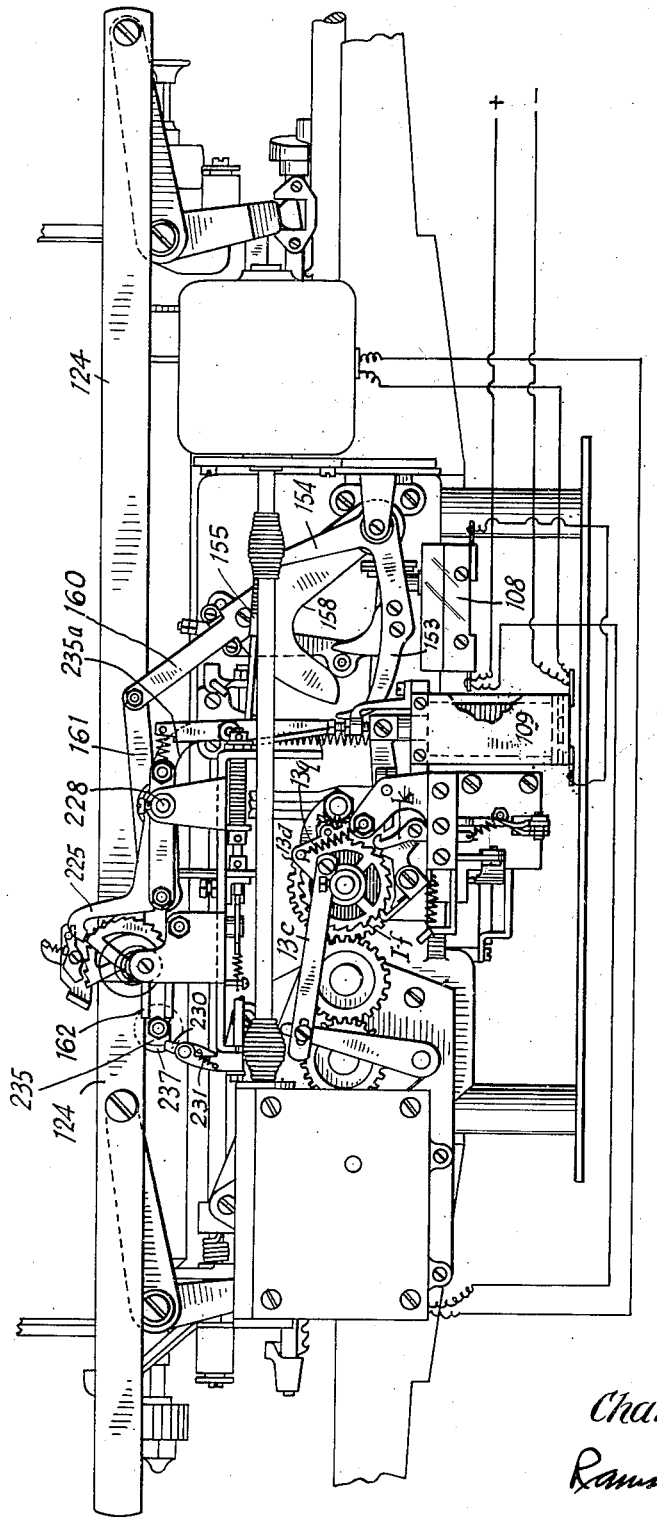
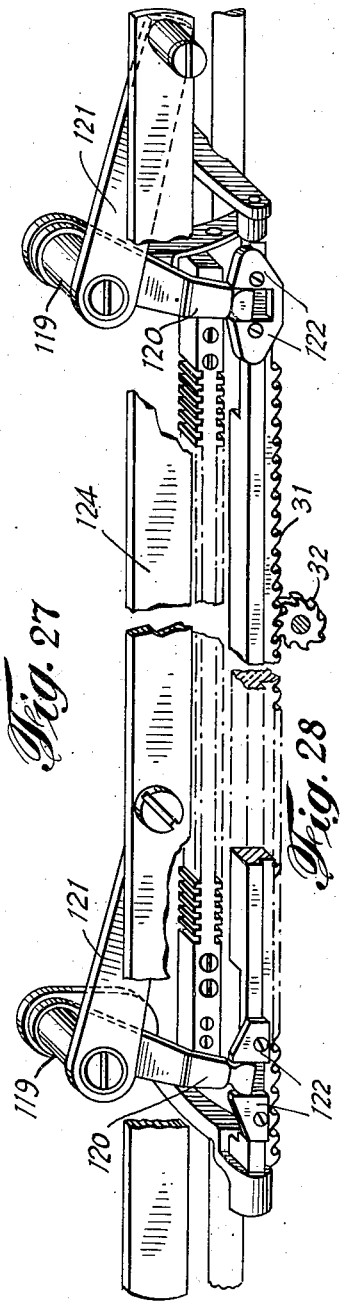
Fig. 27
Fig. 28
INVENTOR
*Charles W. Norton*
BY
*Ramsay, Kent & Chisholm*
his ATTORNEYS March 29, 1949.　　　C. W. NORTON　　　2,465,657
TYPING AND JUSTIFYING MACHINE
Filed Nov. 19, 1945　　　　　　　　　　　　　18 Sheets-Sheet 14

INVENTOR.
Charles W. Norton
BY
Ramsey, Kent & Chisholm
his ATTORNEYS

March 29, 1949.  C. W. NORTON  2,465,657
TYPING AND JUSTIFYING MACHINE
Filed Nov. 19, 1945  18 Sheets-Sheet 15
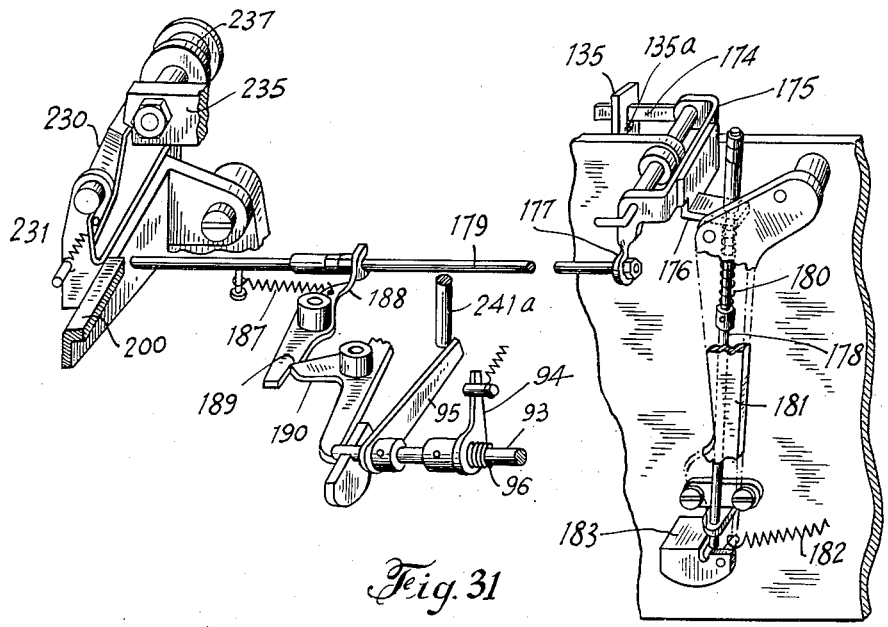
Fig. 31
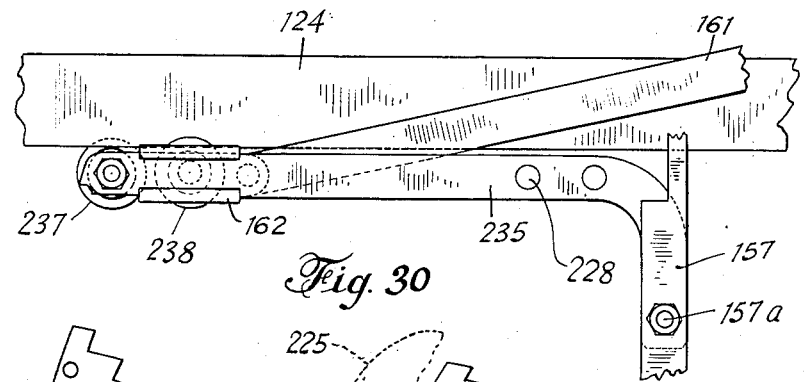
Fig. 30
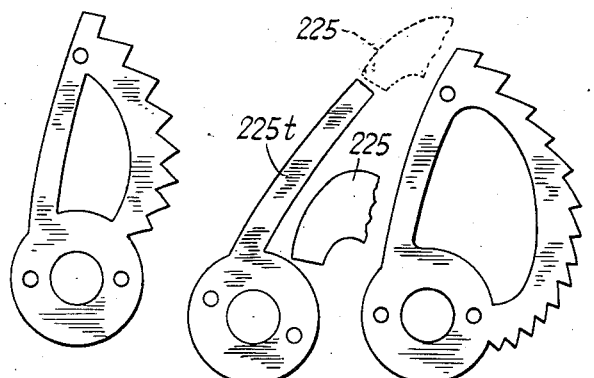
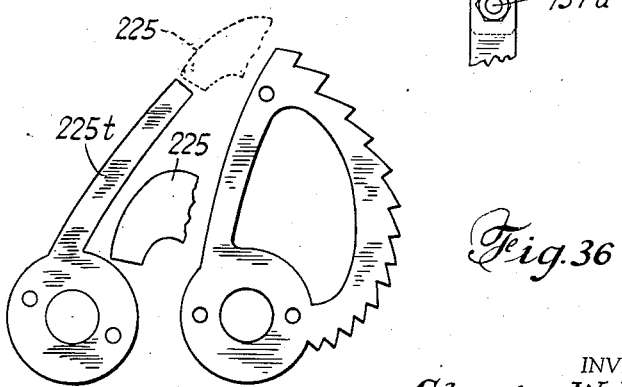
Fig. 35  Fig. 35a  Fig. 36
INVENTOR.
Charles W. Norton
BY Ramsey, Kent & Chisholm
his ATTORNEYS March 29, 1949.    C. W. NORTON    2,465,657
TYPING AND JUSTIFYING MACHINE
Filed Nov. 19, 1945    18 Sheets-Sheet 16
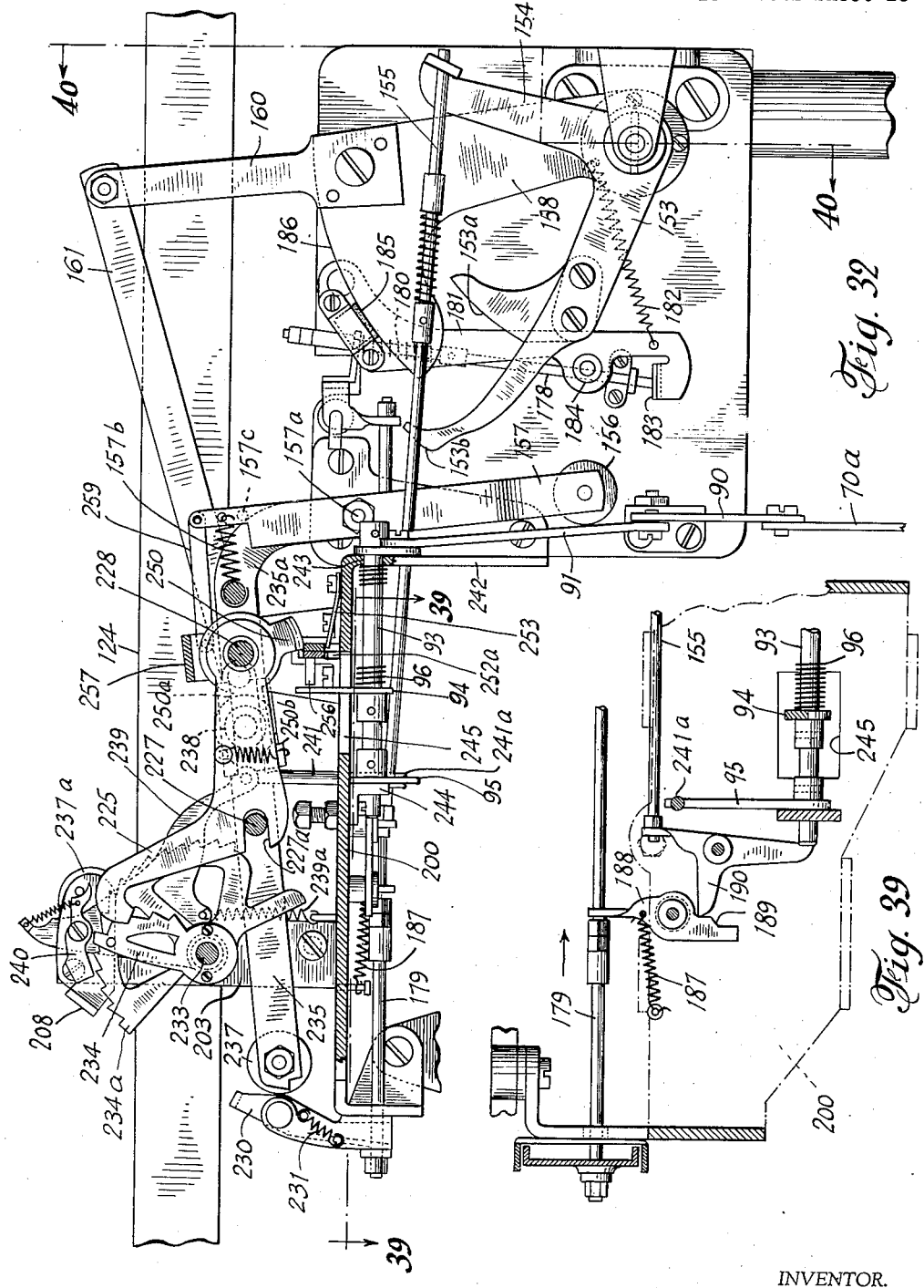
INVENTOR.
Charles W. Norton
BY
his ATTORNEYS March 29, 1949. C. W. NORTON 2,465,657
TYPING AND JUSTIFYING MACHINE
Filed Nov. 19, 1945 18 Sheets-Sheet 17
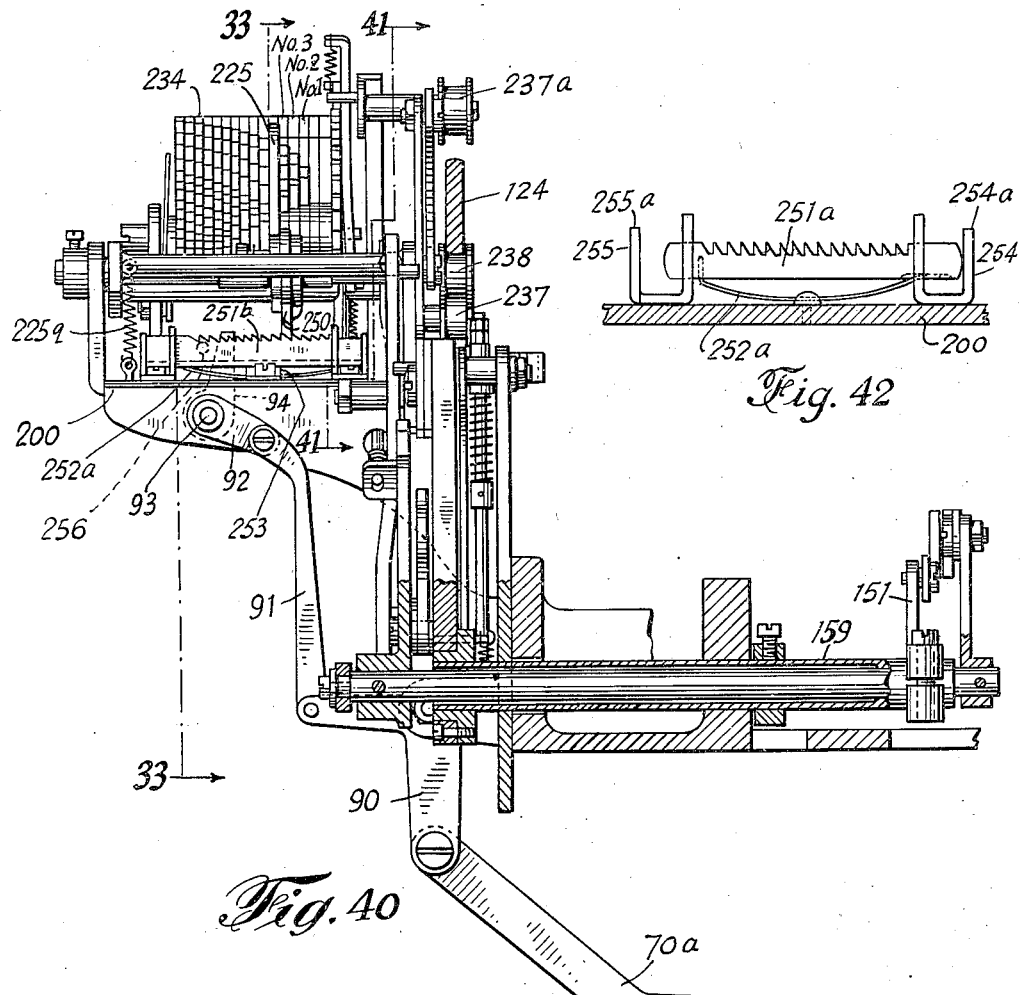
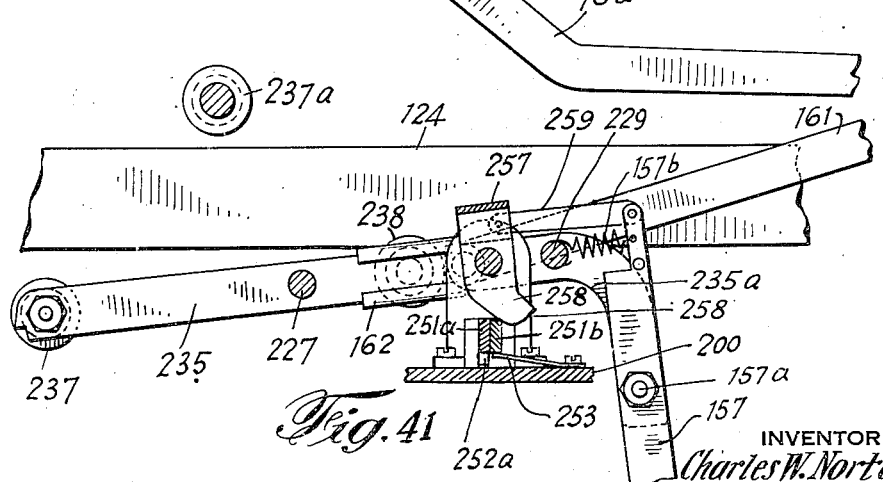
INVENTOR
Charles W. Norton
BY
Ramsey, Kent & Chisholm
ATTORNEYS March 29, 1949. C. W. NORTON 2,465,657
TYPING AND JUSTIFYING MACHINE
Filed Nov. 19, 1945 18 Sheets-Sheet 18
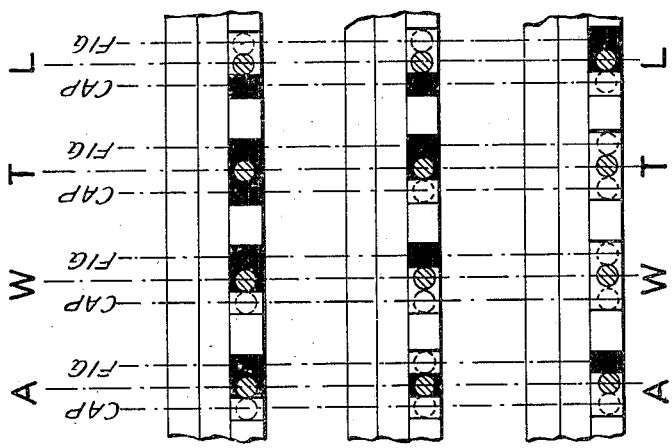
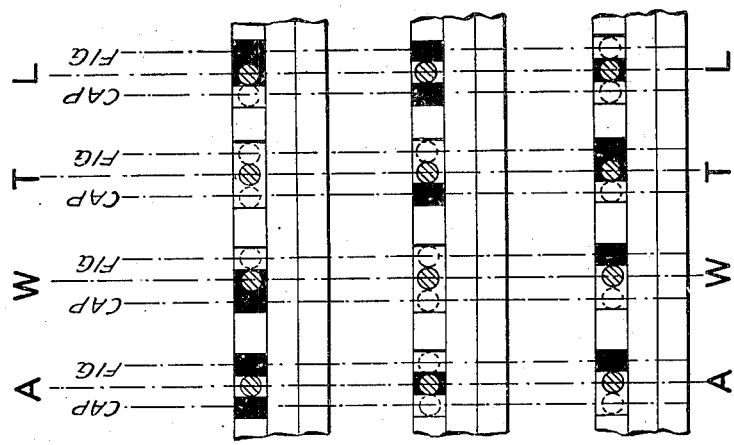
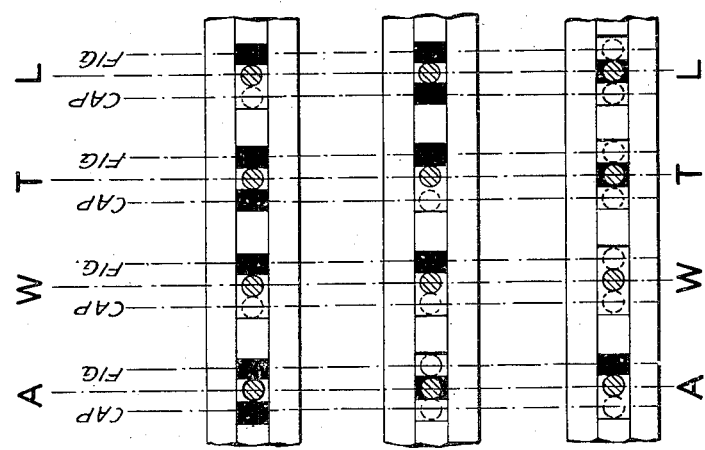
INVENTOR
Charles W. Norton
BY
Ramsey, Kent & Chisholm
his ATTORNEYS Patented Mar. 29, 1949

2,465,657

UNITED STATES PATENT OFFICE 2,465,657

TYPING AND JUSTIFYING MACHINE

Charles W. Norton, West Orange, N. J., assignor to Ralph C. Coxhead Corporation, New York, N. Y., a corporation of Delaware Application November 19, 1945, Serial No. 629,350

20 Claims. (Cl. 197—84)

This invention relates to typewriting machines and as illustrated and described is embodied in a machine known in the art as a "Varityper," in which a supporting anvil wheel carries interchangeable type shuttles, so that various styles and sizes of type may be used at will; and it relates more especially to those machines which have differential letter spacing mechanism.

Machines of this type may be provided with line justifying mechanism whereby they are capable of producing typed sheets in simulation of ordinary printed matter, which may be used for reproduction by photolithographic or other printing processes. In my Patent No. 2,298,805, issued October 13, 1942, I have disclosed a typewriting machine having differential spacing mechanism whereby spacing movement may be given to the carriage according to the conventional widths given in ordinary printed matter to the various letters and characters used, with provision for adaptation to different sizes of type. It is desirable, however, to make use of different styles of type, which require different systems of spacing, such, for instance, as roman, gothic or italic.

The construction involves the utilization of a paper carriage of sufficient width to permit the use of a relatively wide sheet of paper. In operation, preliminary unjustified or uneven length lines are written in a column at the left of the paper, and a justified line is then written in a column on the right, after the operation of a tabulator key. When the end of a preliminary line is being approached, the machine rings a bell, or establishes some other signal, and the operator may then type a few more characters before the ultimate limit is reached. This signal is the margin signal of the ordinary typewriter. The operator having finished writing the preliminary line, depresses a tabulator key which automatically releases the carriage so that it may move to the left-hand margin of a new or second column at the right side of the paper, and the operator then writes the same line over in this second column, and the machine automatically justifies this rewritten line so that it occupies a standard length. This result is obtained accurately and automatically by the action of the machine, which distributes the required extra spacing only between the words of the line, leaving the spacing between the letters unchanged.

It is an object of this invention to provide an improved mechanism whereby the differential spacing may be used for different sizes of type, but also may be provided with means conveniently applicable for changing the system of spacing to any one of several different styles of type.

Another object of the invention is to provide an improved justifying mechanism for a typewriting machine equipped with a differential spacing control, whereby the carriage feed may be advanced according to the various widths of the different characters, and at the same time the lines may be justified to uniform length, by varying only the spacing between words, and not the letter spacing.

Another object is to provide an improved tabulating mechanism.

Another object is to provide a mechanism of the kind that is simple, automatic and capable of use by any typist without special training or skill.

Further objects and advantages will become apparent in the description of the invention, taken in connection with the accompanying drawings comprising a part of the specification. In the claims, as well as in the description, parts are identified by specific names for convenience, but such nomenclature is intended to be as generic in its application to analogous parts as the prior art will permit. The best form in which I have contemplated applying my invention is illustrated in the accompanying drawing, in which Fig. 1 (Sheet 1) is a plan view of the preferred form of typewriting machine with certain parts omitted which are well-known and are not necessary to a complete understanding of the present invention.

Fig. 2 (Sheet 2) is a transverse vertical sectional view taken on line 2—2 of Fig. 1.

Fig. 3 (Sheet 2) is a sectional view of a dial and index for indexing the position of the carriage relative to the left-hand margin of the typed sheet.

Fig. 3a (Sheet 2) is a fragmentary front elevation of the dial, etc. shown in Fig. 3.

Fig. 4 (Sheet 3) is a horizontal plan view, partly in section, of the escapement gearing.

Fig. 6 (Sheet 3) is a detail sectional view on the line 6—6 of Fig. 4.

Fig. 7 (Sheet 5) is a plan detailed section on line 7—7 of Fig. 8 and illustrates the relation of the key push rods to the universal bars that control the differential letter spacing.

Fig. 9 (Sheet 7) is a table showing the units of escapement movement allowed for each letter and character of the roman style type.

Fig. 15 (Sheet 1) is a view showing the connection of the space key in its relation to the single unit universal bar.

Fig. 16 (Sheet 9) is a view looking at the end of the escapement shaft from the rear of the machine and shows the escapement wheel I—f which permits the carriage to escape one unit. The escapement dogs are shown in normal position when the carriage is stationary. There is also shown the mechanism by which the escapement solenoid is actuated by the operation of the printing keys.

Fig. 17 (Sheet 9) is a sectional plan view on the line 17—17 of Fig. 16.

Figure 18:
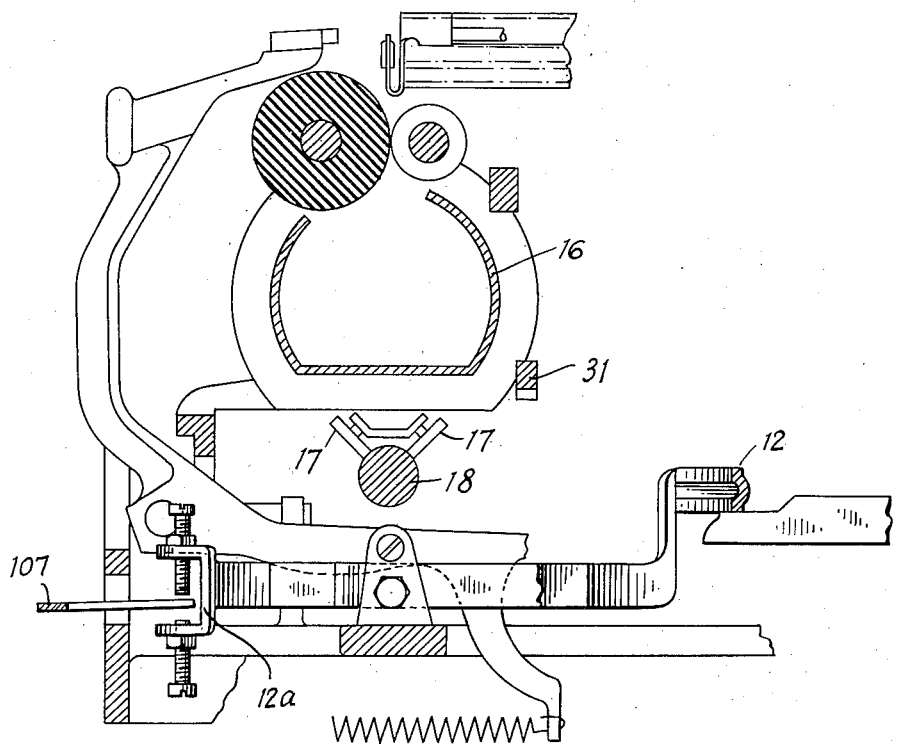

Fig. 18 (Sheet 11) is an elevational detailed view illustrating the key-controlled release mechanism for the hammer which drives the paper against the type to produce the printing impression.

Fig. 19 (Sheet 10) is a view in side elevation of the two-button back-spacing key.

Fig. 20 (Sheet 10) is a broken perspective view of the back-spacing key and mechanism.

Fig. 21 (Sheet 10) is a detailed view of the escapement dog and a portion of one of the escapement wheels when a type key has been depressed, and shows the detent disengaged from the teeth of the escapement wheel.

Figure 5:
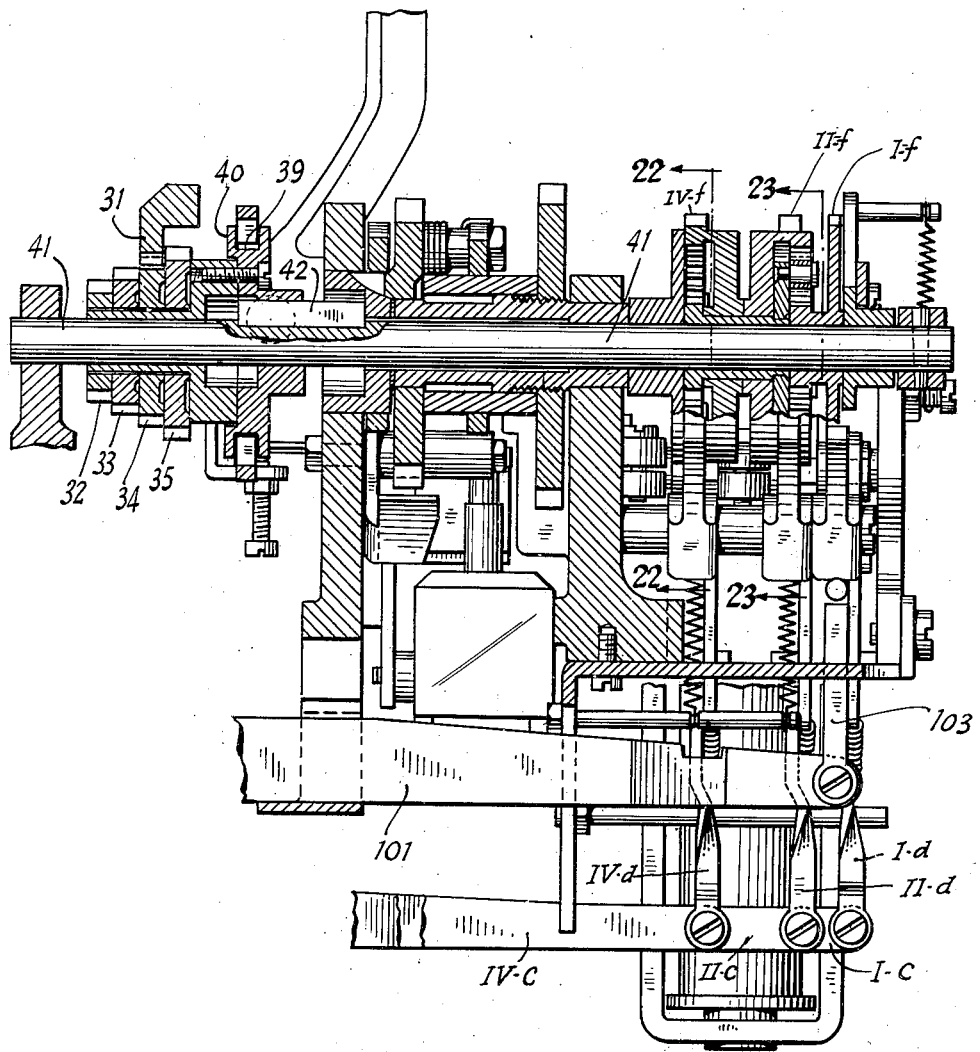
Fig. 5 (Sheet 4) is a vertical sectional view on line 5—5 of Fig. 4.
Figures 22, 23:
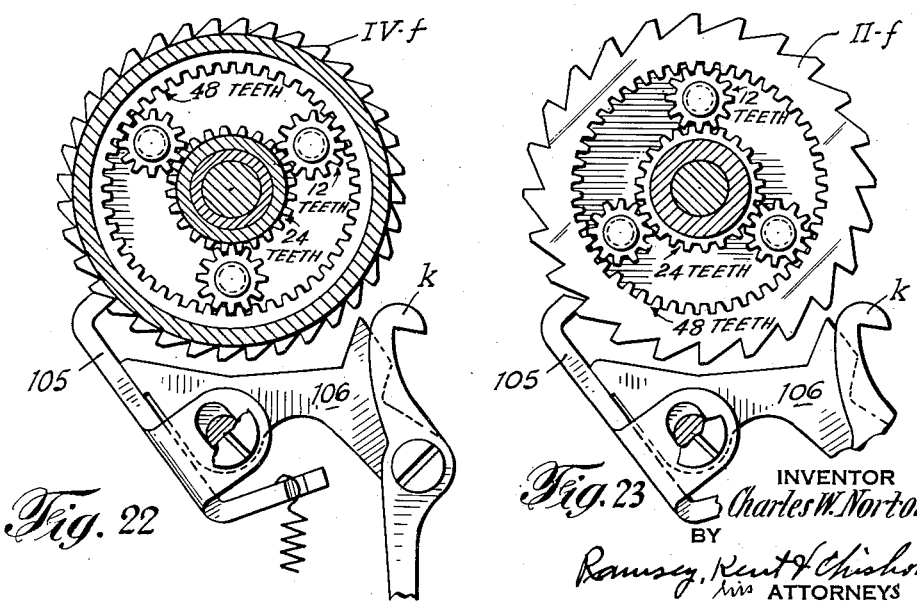

Fig. 22 (Sheet 11) is a sectional view on the line 22—22 of Fig. 5 and illustrates a cross section through escapement wheel IV—f together with the gearing connecting this escapement wheel to the escapement shaft.

Fig. 23 (Sheet 11) is a sectional view on the line 23—23 of Fig. 5 and illustrates escapement wheel II—f and its connecting gearing, with the escapement dogs thereof in normal position with the carriage stationary.

Figure 24:
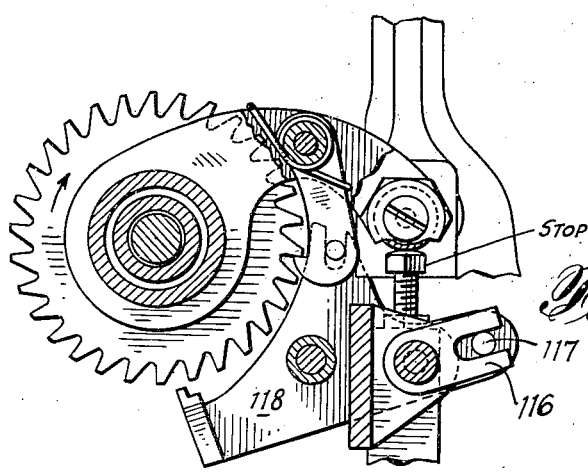

Fig. 24 (Sheet 4) is a detailed view of the hammer release mechanism and is taken on line 24—24 of Fig. 4.

Fig. 25 (Sheet 12) is a perspective view of the mechanism, with shaft 152 axially displaced, whereby the required expansion for line justification is determined.

Fig. 26 (Sheet 12) is a perspective view of the tabulator key and connected mechanism in normal position.

Fig. 27 (Sheet 13) is an elevational view of the justification mechanism from the back of the machine, in the normal position for the beginning of a preliminary line.

Fig. 28 (Sheet 13) is a perspective view of the mechanism which transmits the justification movement to the paper carriage.

Figure 29:
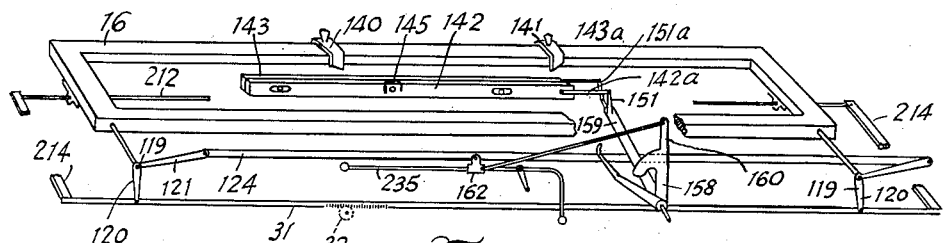

Fig. 29 (Sheet 15) is a diagrammatic illustration of the operation of the carriage mechanism on the justification device.

Fig. 30 (Sheet 14) is a detail of the expansion determining mechanism.

Fig. 31 (Sheet 14) shows the connection of the tabulator key to the justification mechanism.

Fig. 32 (Sheet 16) is a sectional elevation of parts of the justification mechanism on line 32—32 of Fig. 40 showing the position of the parts during the typing of the justified line after the second operation of the space bar.

Figure 33:
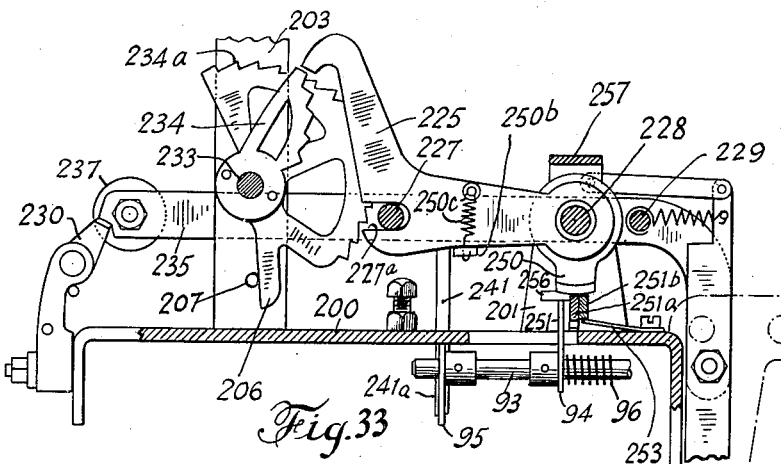

Fig. 33 (Sheet 15) is a sectional elevation of the justifying mechanism on line 33—33 of Fig. 40, showing the position of parts during the typing of the preliminary line.

Figure 34:
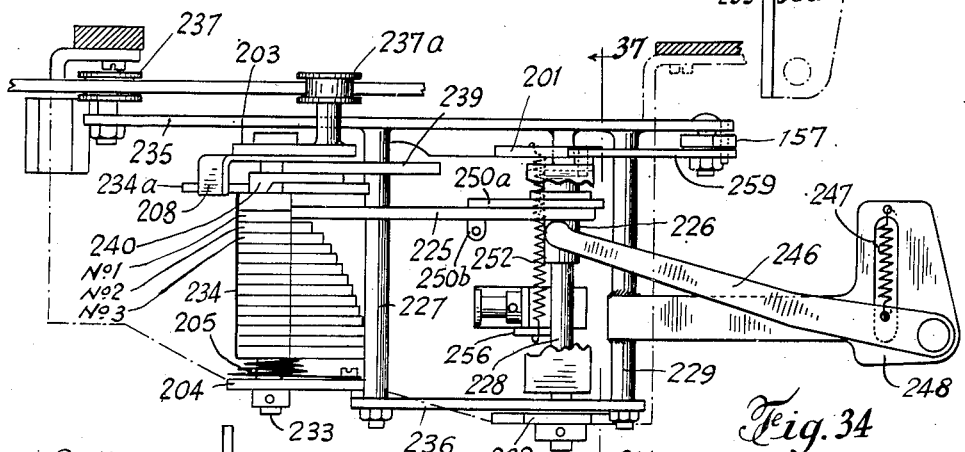

Fig. 34 (Sheet 15) is a plan view of the mechanism shown in Fig. 33.

Fig. 35 (Sheet 14) is a side elevation of element No. 8 of the expansion distributor.

Fig. 35a (Sheet 14) is a side elevation of elements No. 0 and No. 1 of the expansion distributor.

Fig. 36 (Sheet 14) is a view similar to Fig. 35 showing element No. 14.

Figures 37, 38:
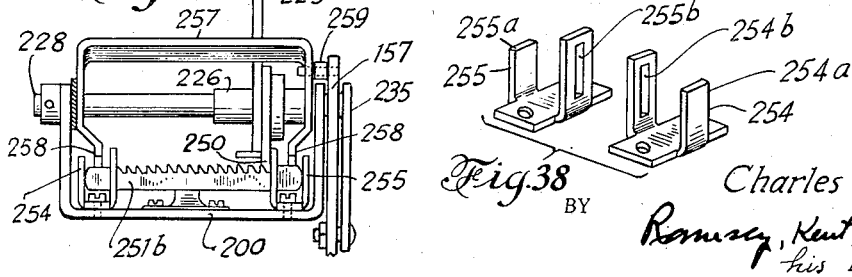

Fig. 37 (Sheet 15) is a sectional elevation on the line 37—37 of Fig. 33.

Fig. 38 (Sheet 15) is a perspective view of the brackets or guides for the ratchet device actuated by the space bar.

Fig. 39 (Sheet 16) is a plan of the mechanism located below the shelf for supporting the justifying mechanism, which controls the actuation of the justifying mechanism by the space bar.

Fig. 40 (Sheet 17) is a view in sectional elevation on line 40—40 of Fig. 32 of the justifying mechanism showing the connections from the space bar thereto.

Fig. 41 (Sheet 17) is a view in sectional elevation on line 41—41 of Fig. 40 showing the cam mechanism for disengaging the lateral ratchet device.

Fig. 42 (Sheet 17) is a detail view of the ratchet element.

Figs. 43, 44 and 45 (Sheet 18) are diagrammatic illustrations of the positions of the universal bars relative to the printing key push rods for roman, gothic and italic styles of type respectively.

Figs. 46 and 47 (Sheet 5) are views of details of the means for shifting the universal bars to positions for various styles of type.

The machine herewith illustrated and described is of the key-controlled shuttle type, where the printing impression is formed by the impact of a printing hammer which forces the paper against the ribbon and type, and is known in the art as the "Varityper." It comprises the main frame 1 (Fig. 1) which carries the mechanism of the machine. Type keys 2 (only a few being illustrated) are mounted on a pivot bar 4 (Fig. 2) supported by the main frame 1. These type keys at their front ends carry finger buttons 5 and at the rear ends cooperate with the actuator bars 6 (one of which is shown in Fig. 2) to operate actuators 7. These actuators 7 swing the shuttle arm 8 (Fig. 1) so that it oscillates the shuttle 9 on an anvil 9a to bring the proper type to the printing point. Stop rods 10 (Fig. 2) are provided over each type key lever 2 to engage the shuttle arm 8, thereby definitely positioning the proper type at the printing point when a type key is operated. This mechanism is old in the art and will not be described in detail. See patent to Trego 1,880,592, October 4, 1932.

The universal bar 12 (Fig. 2) actuates the ribbon mechanism comprising the ribbon spools 14 (Fig. 1), the mechanism not being illustrated in detail since this construction is well-known in the art. See patent to Tgero 1,930,063, October 10, 1933.

The paper carriage 16 (Fig. 2) is provided with antifriction rolls 17 which travel upon the carriage supporting rod 18 as the carriage moves to the left under the influence of the carriage spring. This mechanism also is old and well-known in the art and therefore will not be described in detail.

The carriage 16 is moved in letter-space direction by a carriage spring which is mounted in a drum 19 (Fig. 1). Drum 19 carries a band which is attached to the carriage. The drum 19 is provided with a bevel gear 19a which meshes with the bevel pinion 19b secured to the shaft 20a (Figs. 1 and 3) to rotate the shaft 20a when the drum 19 turns as the carriage is moved. The shaft 20a carries a pointer 20 mounted between friction discs 20d and 20e. These discs are held in place by a nut 20f threaded on the shaft 20a. The construction is such that the pointer 20 may be set, as hereinafter explained, with reference to the dial 20b. The dial carries a bezel 20g having an index point 20c. This bezel 20g is held in place by a friction ring 20h so that it may be set and retained in position to indicate the position of the carriage relative to a predetermined point, as hereinafter explained.

The machine is provided with shift keys 21 (Fig. 1) designated as "Fig" which position certain characters for operation at the printing point, and with shift keys 22 designated as "Cap" which position capital letters at the printing point. This mechanism is well-known in the art and is described in the patent to Spaloss 2,051,112, August 18, 1936.

The structure having to do more especially with the spacing movements of the platen carriage comprises, among other devices, a variable space-control mechanism whereby the carriage of the machine may be given its spacings for fonts of different sized type. This mechanism (Figs. 1, 2, 4, 5 and 6) comprises a shaft 24 slidably and rotatably mounted in bearings in the main frame and controlled by a hand lever 25 (Fig. 1) which is adapted to be engaged in various notches 26 in the index plate 27. The rear end of the shaft 24 carries an arm 28 (Fig. 6) provided with an offset plate 29, adapted to enagage a rack-lifting and holding dog 30 to cause the dog to engage in the teeth of rack 31 and lift it, whereby it may be raised from and lowered into engagement with a particular carriage gear wheel 32, 33, 34 or 35 (Figs. 4, 5 and 6) mounted on the escapement shaft 41. This dog at the same time, by interlocking with the teeth of rack 31, prevents the carriage from moving while the rack is disengaged from the carriage gear wheels. A lever 36 (Fig. 1) pivoted at 37 on the main frame is connected at one end with a sleeve or collar carried by shaft 24, and at the other end engages a groove 39 in a disc 40 (Fig. 5) which is secured to the carriage gear wheels 32, 33, 34 and 35. This group comprising disc 40 and gear wheels 32, 33, 34 and 35 constitutes an integral unit slidably mounted on escapement shaft 41, and is compelled to rotate therewith by key 42. By moving hand lever 25 from one notch 26 to another in the index plate 27, the corresponding carriage gear wheels 32, 33, 34 or 35 may be caused to slide on shaft 41 and engage the rack 31, and when this is done the normal basic carriage spacings per inch will be in accordance with the number on the index plate 27. This mechanism is old and is described in the patent to Trego No. 1,918,299, July 18, 1933. By the means described, the degree of spacing may be determined according to the size of the type to be used.

*Differential spacing*

To afford conventional spacings for the various letters and characters that are not uniform in width, feeding mechanism is designed to permit various degrees of rotation of the carriage feed wheel with which the escapement rack is in engagement; and to that end there is provided distinct control mechanisms to cause carriage movement of one unit, two units or four units or any combination of such units. This mechanism is similar to that shown in my U. S. Patent No. 2,298,805, issued October 13, 1942.

The various combinations of movements are attained by three universal bars, which control the escapement to permit the various degrees or units of carriage movement. One universal bar, designated I—b (Fig. 7), permits or occasions a carriage movement of one unit; another designated II—b, causes a carriage movement of two units; a third universal bar, designated IV—b, causes a carriage movement of four units. By means of these three universal bars the depression of any key, or of the space bar, permits the required carriage movement, which may range from one unit to seven units of motion.

The table shown in Fig. 9 designates the carriage movement as measured in arbitrary units for each letter and character in the roman style that the machine is capable of printing. For illustration of the operation of the differential spacing mechanism, a few keys have been selected, namely, the keys for the letters "L," "A," "T," "W," and the period (.). For instance, referring to the table of Fig. 9, the allotment of space for the lower case "a" is five units, and for the capital "A," six units; for the lower case "l," three units, and for the capital "L," five units; for the lower case "t," three units, and for the capital "T," six units; for the lower case "w," seven units, and for the capital "W," seven units; and for the period (.), the allotted space is two units.

The amount of carriage movement is selected or predetermined by operation of the various printing keys, the space bar and the spacing key SP. The operation of the various printing keys and the space bar actuates a gearing mechanism which controls the spacing movement of the carriage. Thus, there are two groups of mechanisms involved in the differential spacing mechanism; namely, the mechanism for the selection by the space bar and type-key levers of the proper carriage movement, and the group of mechanisms comprising the carriage feed mechanism itself.

Referring now to the selective mechanism associated with the type keys (see Fig. 2), it will be observed that each type key lever is provided with depending rods, and in most cases there are three of these rods associated with each type key.

Figure 10:
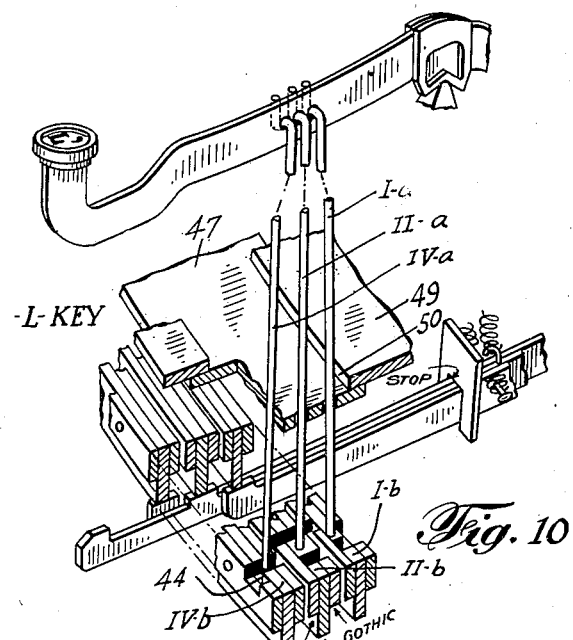
Fig. 10 (Sheet 8) is a detailed view of the push rods and controls of type key "L," in their relation to the three universal bars.

The rods will be designated I—a, II—a and IV—a (Fig. 10). There are three universal bars located beneath the lower ends of these push rods, and the universal bars are designated I—b, II—b and IV—b. These universal bars are notched on their upper surface with notches 44, 45 and 46, respectively, the notches constituting inoperative regions. The push rods I—a, II—a and IV—a all pass through a movable rod plate 47 (Figs. 1, 2 and 7 to 10).

As shown in Fig. 7, this rod plate 47 is slidable in an arc over the universal bars I—b, II—b and IV—b for a short distance due to the mounting of the plate 47 on stud screws 48 secured to the bottom of plate 49. Plate 49 is fixedly mounted in the machine frame and is provided with an arcuate opening 50 through which the push rods extend. The rod plate 47 is provided with an upstanding pin 51 which rests between the ends of spring arms 52 and 54 pivoted at 55 and 56 to the top plate 49. These arms are normally pulled together by the tension spring 57, thus causing the arms to bear against the stationary pin 58 mounted on the top plate 49 and normally aligning the upstanding pin 51 on the rod plate 47 in the central position, but allowing a movement thereof either to the right or the left of the central position and permitting the arm which has been moved away from the stationary pin 58 to urge the rod plate toward normal position.

Figure 8:
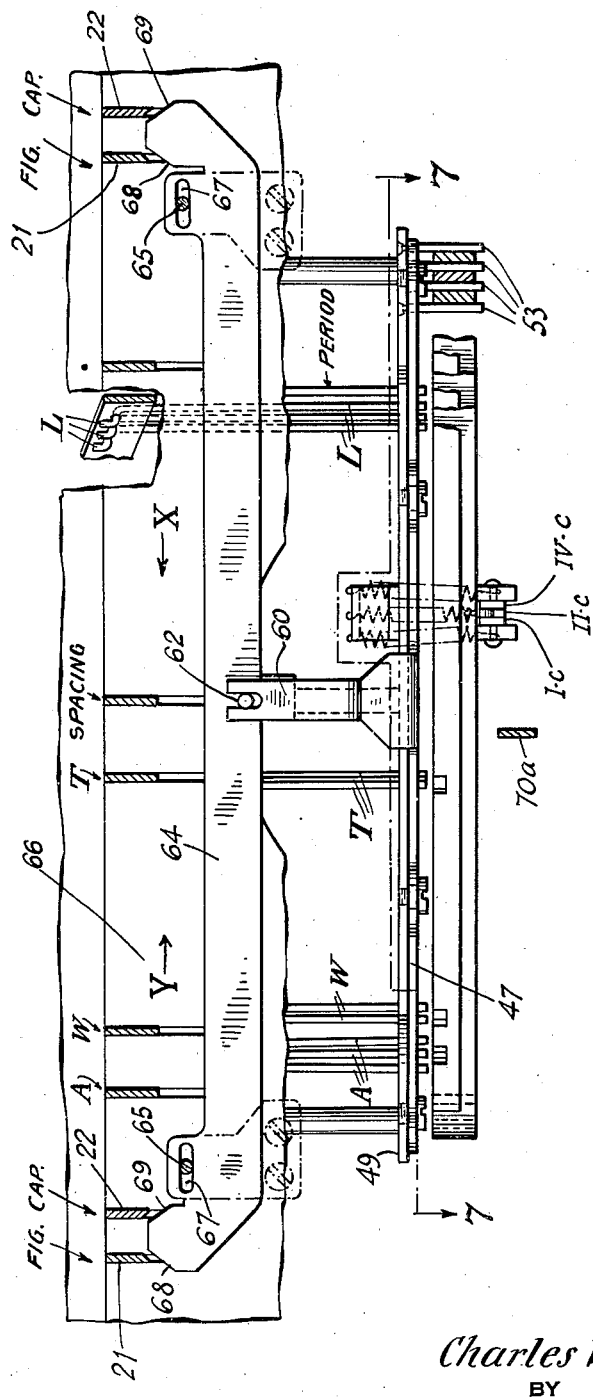
Fig. 8 (Sheet 6) is a detail sectional elevational view taken on the line 8—8 of Fig. 1 and illustrates the mechanism controlled by the shift key levers for changing the effect of the type key levers upon the differential letter spacing mechanism.

The rod plate 47 is provided with a forward extension 59 that carries an upwardly extending forked bracket 60 (Fig. 8). Bracket 60 extends on each side of a pin 62 carried by a shift bar 64 slidably mounted upon stud screws 65 secured to the key comb 66. The stud screws 65 extend through slots 67 in the shift bar 64. The ends of the shift bar are provided with cam surfaces 68 that cooperate with the "Fig" shift keys 21, and also with cam surfaces 69 that cooperate with the "Cap" shift keys 22. It will be observed that when the "Cap" shift keys 22 are depressed the shift key levers cooperate with the cam surfaces 69 to move the shift bar in the direction of the arrow X, namely, to the left; and this shifts the rod plate 47 to the left. This moves all the lower ends of push rods I—a, II—a and IV—a to the left. It will be noted that when the "Fig" shift keys 21 are depressed the shift key levers cooperate with the cam surface 68 and the cam shifts bar 64 in the direction of the arrow Y, namely, to the right, thereby shifting the rod plate 47 and the lower ends of the push rods to the right. The normal position of the rod plate 47 and the shift bar 64, as previously stated, is in the centralized position.

Referring now to Figs. 10 to 14, which illustrate the setting for the use of roman letters (i. e., with the middle strips of the universal bars in active position), it will be noted that if the type lever "L" is depressed with the push rods in the position shown in Fig. 10, the push rod I—a will depress the universal bar I—b and the push rod II—a will depress universal bar II—b, while push rod IV—a will descend into notch 44 in universal bar IV—b without actuating it. Thus, when the type lever "L" is depressed without the use of either shift key, the universal bars I—b and II—b are actuated; but universal bar IV—b is not actuated because rod IV—a descends into notch 44, and is therefore inactive.

Figure 11:
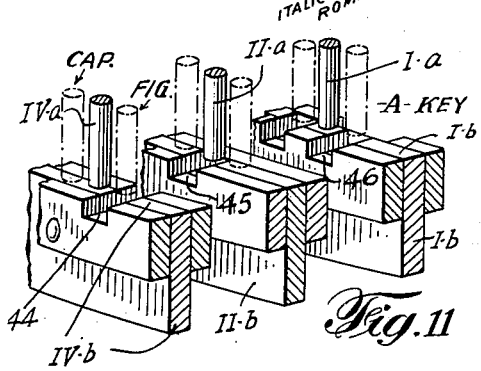
Fig. 11 (Sheet 8) illustrates the push rods carried by the letter "A," showing in dotted lines the effect of the shift keys on these push rods in relation to the three universal bars.

Referring to Fig. 11, which illustrates the push rods connected with the "A" key, it will be observed that when a lower case letter "a" is typed the push rod I—a depresses the universal bar I—b, and the push rod IV—a depresses the universal bar IV—b, occasioning a carriage movement of five units for lower case "a," push rod II—a descending into notch 45 in universal bar II—b. The dotted lines (Fig. 11) representing the push rods to the right of the full line drawing thereof show the position of the push rods when the "Fig" shift keys 21 are depressed, and it will be observed that the push rod II—a is in position to depress the universal bar II—b when the type key is now depressed, while the push rods I—a and IV—a will descend into notches 46 and 44 respectively. Thus, when the "Fig" shift is actuated the "A" key acts to control the printing and spacing of the quotation mark (") allotting a spacing of two units thereto. The dotted line representation of the push rods to the left of the solid line showing illustrates the position of these push rods when the "Cap" shift keys 22 are depressed, and it will be observed that push rods II—a and IV—a are in a position to actuate the universal bars II—b and IV—b when the type lever "A" is depressed, while push rod I—a will descend into the notch 46 of universal bar I—b without actuating the same. This determines a carriage movement of six units for a capital "A."

Figure 12:
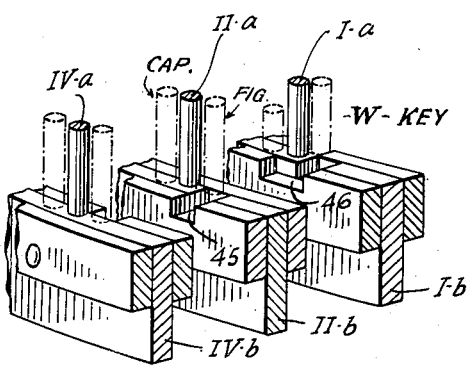
Fig. 12 (Sheet 8) illustrates the push rods connected with the "W" key, showing in dotted lines the effect of the operation of the shift keys on these rods relative to the universal bars.

Referring now to Fig. 12 which represents the relation of the push rods to the universal bars as to the "W" key, it will be observed that normally the push rods I—a, II—a and IV—a are in a position to depress the universal bars I—b, II—b and IV—b, causing a carriage movement of seven units. This same relation is maintained when the "Cap" shift keys are depressed; but when the "Fig" shift keys 21 are depressed then only the push rod IV—a is effective since the push rod I—a will descend into notch 46 in universal bar I—b and push rod II—a will descend into the notch 45 in the universal bar II—b. Thus the "W" key, which upon operation of the "Fig" shift operates to control the printing and spacing of the figure "2," allots a spacing thereto of four units.

Figure 13:
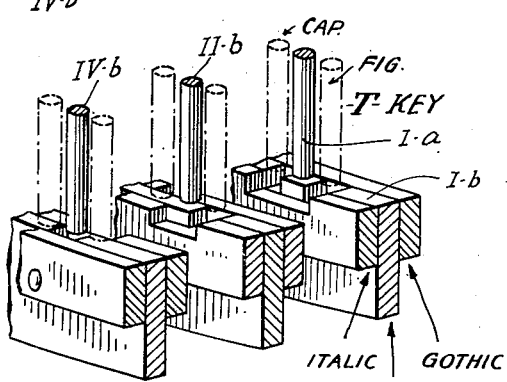
Fig. 13 (Sheet 8) illustrates the push rods connected with the "T" key.

Fig. 13 represents the push rods carried by the "T" key, and normally in this case universal bars I—b and II—b will be depressed when the type key lever is depressed for printing and spacing the lower case "t." The IV—a push rod will descend into the notch 44 in the IV—b universal bar, affording a spacing of three units. When the "Cap" shift keys are effective universal bars II—b and IV—b are depressed, affording a spacing for the capital "T" of six units. When the "Fig" shift keys are effective to afford a spacing for the figure "5" only the IV—b universal bar will be depressed affording a spacing of four units.

Figure 14:
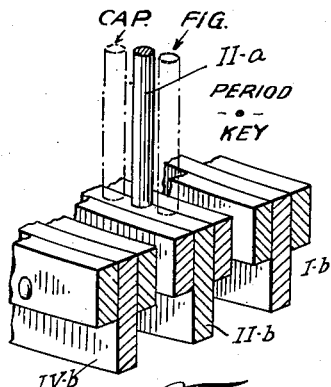
Fig. 14 (Sheet 8) is a detail view of the push rod associated with the period (".") key.

Referring to Fig. 14, which represents the "period" type key, it will be observed that only one push rod II—a is attached to this key, and that it is always effective on the universal bar II—b regardless of the use of shift keys 21 and 22. This occasions a carriage movement of two units.

The space bar 70, (Figs. 1 and 2) is provided with two arms 71 which are pivoted at 72 to brackets 74 on the main frame 1. The two arms 71 have secured thereto downwardly projecting arms 75, which carry a supporting member 76 with two projecting ears 77 mounting a pin 78 on which is journaled roller 79. On the main frame 1 of the machine is secured a bracket 80 having upstanding arms 81 and 82. A tension spring 83 is connected between arm 81 and member 76 to hold member 76 against one side of a notch 84 in arm 82, thereby holding the space bar 70 in normal elevated position.

Pivoted on an extension of pin 78 is a spacer rod 70a which extends under the machine to the rear, where it serves to operate mechanism to be hereafter described. It will be observed that depression of the space bar 70 not only pushes rearward the spacer rod 70a, but simultaneously advances roller 79 so that it contacts the inclined end of escapement lever II—c, with the result of depressing that lever to effect a spacing of two units.

There is also provided a space key SP for imparting to the paper carriage a movement of one unit (Figs. 1 and 15). The space key is mounted on a key lever 71a, having an arm 75a extending downward and carrying a roller 79a. The space key is held in position by a spring 83a. On depression of the space key, roller 79a acts to depress extension I—bx welded or otherwise secured to universal bar I—b, which in turn depresses spacing lever I—c to control the unit escapement (see Fig. 7).

The universal bars I—b, II—b and IV—b are guided by guide pins 86. They rest upon the forward ends of escapement levers I—c, II—c and IV—c (Figs. 7 and 8). These escapement levers are all mounted on a pivot pin 87 carried by bracket 88 secured to the frame of the machine; and they extend rearward and are connected to escapement links I—d, II—d and IV—d (Fig. 2).

Escapement links I—d, II—d and IV—d are each moved upward on depression of the corresponding universal bars to which they are respectively connected. They are guided in their upward movements by openings h in plate i through which they pass (Figs. 16 and 17). Each escapement link has an inclined surface or cam g on the edge which contacts an adjustable member h' that overlies one side of the slot h (the right side as viewed in Fig. 16) so that upward movement of a link causes it to be pushed to the left. Adjustable members h' provide for adjusting the clearance between latches k and lifting fingers 113.

When a universal bar (I—b, II—b and IV—b) is depressed, the rear end of its respective escapement lever (I—c, II—c or IV—c) is raised, and this raises the corresponding escapement link (I—d, II—d or IV—d). The cam surface g on the escapement link (shown in Fig. 16, it being understood that each of the links I—d, II—d and IV—d have identical cam surfaces) engages the end of slot h in plate i; and this operation swings the latch lever k in a clockwise direction to cause the hooked upper end to be engaged over the lifting finger 113. This is a pre-setting or selecting operation. At the same time, the depressed key lever lifts universal bar 12 (Fig. 18), thereby lowering the end 12a of the lever 12 to depress switch lever 107 (Figs. 4, 16 and 18) to thereby close switch 108 and energize solenoid 109.

The depression of any printing key thus actuates solenoid 109, causing a downward pull on lever 112 which is rigidly secured on shaft 111. Shaft 111 is journaled in the main frame of the machine (Figs. 4 and 16) and carries rigidly affixed thereto three lifting fingers 113, which serve to lift any of the three latches k which may be selected for actuation by the depression of any printing key. Shaft 111 also has a rigid arm 114 shown in dotted lines in Fig. 16 biased upward by spring 115, whereby the shaft is held in the inactive position from which it is oscillated by the operation of solenoid 109 on arm 112.

Shaft 111 also has rigidly secured thereto a slotted arm 116 (Figs. 4 and 16) which actuates a pin 117 on the hammer escapement rocker 118 for releasing the escapement of the printing hammer (Fig. 24). The hammer mechanism for driving the paper and the printing ribbon against the printing type is illustrated in Figs. 18 and 24, and is substantially the same as that shown in the patent to Trego No. 1,965,677, dated July 10, 1934.

As has been explained, the selected latches have been moved clockwise so that the hooks on the upper end thereof are in position to be engaged by finger 113, which, on closing of the switch 108, is actuated by the energized solenoid 109 to lift the latches k (Fig. 21) which are pivotally attached to escapement dog 106, thus moving dog 106 into position to intercept a tooth of escapement wheel I—f, or other escapement wheels corresponding to the selected latches. This movement of dog 106 acts also to disengage dog 105 from escapement wheel I—f. In this way escapement wheel I—f (along with any others that may have been selected) is permitted to turn one tooth, affording its allotted degree of movement to the paper carriage.

Operation of either the space bar 70 or unit spacing key SP does not act to close the switch for energizing solenoid 109 because energization of the solenoid occasions a stroke of the hammer, which is to be avoided in a purely spacing action. Provision is made for a proper actuation of the carriage escapement directly on operation of either the space bar or the spacing key without hammer actuation. To accomplish this result, escapement links I—d and II—d are each provided with prolonged extensions q (Fig. 16); and their corresponding latches k are each provided with a shoulder p. On depression of any printing key these links are not pushed upward so far as to lift latches k; but on operation of either space key SP or space bar 70, the corresponding link I—d or II—d is lifted so far that the projection q comes into contact with shoulder p, thus lifting latch k to actuate dogs 105 and 106. Thus, depression of key SP, by advancing to the right (Fig. 15) the roller 79a, depresses the extension I—bx which is rigidly attached in any desired manner to universal bar I—b; and this depression by the key SP is to a greater degree than any printing key depresses universal bar I—b, which greater depression is communicated to spacing lever I—c, and a greater lift to link I—d, with resulting unit escapement. In the same manner, depression of space bar 70, advancing roller 79 to the right, causes a greater depression of spacing lever II—c and a greater lift to link II—d, with resulting escapement of two spacing units. By this means depression of the space bar or spacing key directly actuates the corresponding escapement mechanism, without causing release of the printing hammer—the solenoid 109 not being energized.

The use of differential spacing for the various characters makes feasible the use of characters of varying widths; but, as in typewriting machines of uniform spacing, the typewritten lines do not all terminate with an even margin on the right-hand side of the sheet. As has been stated, an object of the invention is to enable the operator to rewrite the typed preliminary line in a tabulated column of justified lines, by adding the required increment in length to the spacing between words, and not between the printed characters. To this end there is connected to depending arm 75, actuated by the space bar 70 (Figs. 1 and 2), a spacer rod 70a which extends rearward under the machine to a bell crank lever 90 (Fig. 40) pivoted on the frame. Motion to rearward of spacer rod 70a affects the justifying mechanism, as will hereinafter appear. During the typing of the preliminary line the justifying mechanism is automatically adjusted or set by the act of typing for the required expansion in the justified line, as will be hereafter explained.

*Changeable spacing system*

One of the objects of the invention is to provide a machine of the type described which will permit the use of styles of type which have different systems of letter spacing, such, for instance, as roman, gothic and italic. Referring to Figs. 10 to 14, it will be observed that each universal bar I—b, II—b and IV—b consists of a number of separate strips, three in this instance, secured together side by side by rivets or otherwise, with their upper edges in a common plane. Any other number of strips could be so joined, according to the number of different systems of letter spacing that might be required. In Figs. 10 to 14 the middle strips of the universal bars are designed for use with roman characters or other characters having the same system of letter spaces. The left-hand strips of the universal bars are adapted for use with italic characters. The right-hand strips are intended for use with gothic characters. This will be more readily understood by reference to Figs. 43, 44 and 45. As shown, when it is desired to use roman type with the machine, the universal bars are so adjusted that the push rods from the several keys cooperate with the middle strips, as indicated in Fig. 43. If it is desired to use gothic type (Fig. 44), the bars are adjusted so that the character push rods cooperate with the right-hand strips (viewed from the left of the diagram). If it is desired to use italic type (Fig. 45), the universal bars are so adjusted that the character push rods cooperate with the left-hand strips.

As has been already stated, there are three universal bars which determine the amount of carriage motion to be imparted for a given character, or for spacing; and in adjusting the system to a particular style of type to be used, these universal bars are adjusted laterally, in unison, so that control of spacing is allotted to the middle strips, or to the right-hand strips, or to the left-hand strips of these universal bars, as may be desired. The diagrams of Figs. 43, 44 and 45 are designed to illustrate the actuation of the three universal bars I—b, II—b and IV—b by the keys of the various letters A, W, T and L in the three styles of type mentioned. The dark rectangles in the diagrams represent notches or recesses in the universal bars. If a given push rod coincides with a recess in its descent upon the operation of a key, it descends idly having no effect upon the universal bar; but if it does not coincide with the recess it will depress the universal bar. Thus, in Fig. 43 which represents the setting for roman type, the full line sections of push rods for letter "a" indicate depression of the bar for one unit, and the bar for four units—a total of five units for the lower case letter "a." Fig. 44 shows the same action by the letter "a" key for gothic type. The italic style (Fig. 45), however, shows the allotment of four units to the lower case letter "a," and an allotment of seven units for the capital "A." It will be observed that except as indicated for the letter "a" key in the roman and gothic styles, the spacings for the other selected keys are different in each system.

In order that the universal bars may be laterally shifted as a group, so that either the right-hand or the left-hand or the central strips are brought into operative relation to the key push rods, means are provided therefor as shown in Figs. 7, 46 and 47. The universal bars I—b, II—b and IV—b are connected at their ends by side bars I, II and IV with a rod $n$ shiftable in slots $s$ in the frame of the machine; which rod $n$ is shifted by links $o$ cooperating with eccentrics $t$ fixed on shaft $r$, as clearly shown in Figs. 7 and 46. Thus by rotating the shaft $r$ as indicated in Fig. 47 so that the pointer indicates roman, gothic or italic, the universal bars are shifted laterally under plate 47 into position for proper spacing for the system selected.

Referring now to Figs. 43, 44 and 45, it will be observed that the spacing units for the letters "a," "w," "t" and "l" are as follows:

|   | Roman | Gothic | Italic |
|---|---|---|---|
| a | 5 | 5 | 4 |
| w | 7 | 6 | 6 |
| t | 3 | 3 | 4 |
| l | 3 | 2 | 3 |
| A | 6 | 6 | 7 |
| W | 7 | 6 | 7 |
| T | 6 | 5 | 6 |
| L | 5 | 5 | 4 |

It has already been explained that the carriage spacing may be adapted to the use of various sizes of type, of any style, by the shifting of shaft 24 slidably and rotatably adjustable by hand lever 25, to shift one or another of the carriage gear wheels, say 32, into engagement with carriage rack 31. As the operator types either the preliminary line or the justified line the carriage, in whatever adjustment has been made, advances in accordance with the width of the letters, as has been described, and in proportion to the size of the type being used.

*Back spacing*

In a typewriting machine having differential spacing adapted to letters and characters varying in width, as in this invention, it is desirable that provision be made for speedy back spacing, with final adjustment to the exact back spacing required. To meet this need, the back spacing key 3 (Fig. 19) has two buttons, 3a and 3b, one of which operates to back space four units at each stroke, and the other of which operates to back space a single unit with each stroke. It is essential in such case that back spacing be free from mechanical error; and the back spacing mechanism is so constructed as to insure exact spacing. The buttons 3a and 3b are carried by a member pivoted on key 3. This member is yieldably held in the position shown in Fig. 19 by a tension spring 3f. It has a point or toe 3c, which on downward movement of the key by pressure on button 3a clears the frame 1 and permits the key 3 to move downward until it contacts the adjustable stop 3d. This movement effects a back spacing of four units; and button 3a is marked "Back space 4." If, however, the key is operated by pressure on button 3b, the pivoted member which carries the operating buttons is first deflected against the tension of spring 3f, and on downward movement of key 3, toe 3c takes the dotted line position and contacts the frame 1 of the machine, thereby preventing further downward movement. This limited movement is designed to effect only one back spacing unit. The button 3b is therefore marked "Back space 1."

The motion of the back spacing key 3 is communicated to the escapement mechanism by a shaft 13, mounted in the frame 1. This shaft has rigidly secured thereto an arm carrying the roller 13a in contact with extension 3e on the back spacing key. On the rear end of shaft 13 there is rigidly secured an arm 13b connected by a link 13c with a pawl carrier 13d freely mounted for oscillation on shaft 41. Shaft 13 is biased for rotation in clockwise direction by spring 13e the effect of which is to maintain roller 13a in contact with extension 3e on the back spacing key, and to bias pawl carrier 13d toward the normal or inactive position shown in Figs. 16 and 20.

A pawl 23 is pivoted on a pin 23a secured on pawl carrier 13d. It is to be observed that pawl carrier 13d is freely mounted on escapement shaft 41, and that pawl 23 is in position for coaction with the teeth on escapement wheel I—f which is mounted on shaft 41. Proper engagement between pawl 23 and the teeth of escape wheel I—f is obtained by tension spring 23b; and when pawl carrier 13d is in the position shown in Fig. 20, that is, after movement thereof in counterclockwise direction has been begun, pawl 23 engages a tooth of escapement wheel I—f. Further depression of back spacing key 3, therefore, produces backward or counterclockwise movement of that escapement wheel, which is not prevented by dogs 105 and 106.

In normal or inactive position, as shown in Figs. 16 and 20, pawl 23 is out of engagement with escapement wheel I—f; and it is held in this inactive position by a pin 43 secured on the machine frame, which pin is engaged by a notch 43a in pawl 23. In this position link 13c is at the limit of its motion, and, as shown in Figs. 16 and 20, the engagement of pawl 23 with pin 43 prevents link 13c from coming into contact with the hub of plate 13d which is mounted on escapement shaft 41. By this arrangement shaft 41 is protected against substantial transverse load which otherwise would be imposed upon the shaft by the tension of spring 13q.

Escapement wheel I—f is normally under the influence of the carriage drive spring through shaft 41, and is controlled in its rotation by the two dogs 105 and 106, as has been explained heretofore. When the key 3, however, is given a full stroke by pressure upon button 3a so that it contacts the stop pin 3d, the back spacing mechanism will move backward escapement wheel I—f a distance equal to four teeth past escapement dogs 105 and 106. This rotation results in an angular rotation of shaft 41 (counterclockwise, Fig. 20) which is equivalent to four spacing units. When, however, key 3 is actuated by button 3b, motion is arrested by the machine frame as shown by the dotted lines in Fig. 19, and the motion is only sufficient to cause backward rotation of escapement wheel I—f through a distance equal to one tooth, which produces angular rotation of shaft 41 equivalent to one spacing unit. This backspacing mechanism is similar to that shown in my copending application Serial No. 669,805.

*Justification setting mechanism*

The setting mechanism (Figs. 25, 27, 29 and 30) is operated only during the typing of the last part of the preliminary line; and on completion of the line it is locked in adjusted position by operation of the tabulator key preparatory to rewriting the justified line.

Fig. 25 shows certain parts of the setting mechanism separated from their assembled position for convenience of illustration and description. It will be observed that the paper carriage motion is from left to right as viewed from the rear of the machine. This is indicated by the arrow X. The paper carriage is provided with the usual margin-adjusting rack 139, having thereon adjustable dogs 140 and 141, which having been given their proper positions determine the maximum length of the typed preliminary line. Rack 139 is fixedly mounted on the paper carriage. The setting mechanism includes flat operating and restoring bars 142 and 143 respectively, which are slidably mounted on the machine frame 1 by means of screws or pins 150 fixed on the main frame, which pins pass through slots 150a in the bars. These bars 142 and 143 lie alongside of each other and are reciprocable relative to each other. As will appear by reference to Fig. 25 bar 142 is biased toward the left, and bar 143 is biased toward the right, under the tension of spring 148 which acts between the said bars. As shown in Fig. 25 restoring bar 143 is at its extreme right position, the left ends of slots 150a being in contact with pins 150, so that no further motion toward the right is possible. This is the normal position of restoring bar 143, from which it is moved to the left when the carriage is restored to position for beginning a new preliminary line, and to which it returns immediately with the first few units of carriage feed motion. Operating bar 142 is shown at approximately its extreme right position, the spring 148 being extended by the position to which operating bar 142 has been moved by motion of the paper carriage near the end of the preliminary line, as will appear in the further description hereinafter. Bar 142 has along one side a pivoted lever 144 which carries a stop 145. This lever is held under tension of spring 148 against abutment 142b on bar 142 so that stop 145 projects above bar 142 in the path of motion of dog 140. Pivoted lever 144 has a lug 144b with which rod 195 is engaged and by which the lever may be drawn downward against the spring tension, so that stop 145 may be withdrawn from the path of dog 140.

Restoring bar 143 is similar in structure to bar 142, and carries pivoted to its side opposite bar 142 a lever 146 which carries a stop 147, and which is held under spring tension against abutment 143b on bar 143, so that stop 147 projects over and above both bars 143 and 142. Pivoted lever 146 is bent or offset near its pivoted end so that the principal portion thereof lies within a cutaway space a in the upper edge of bar 143 and in the plane of that bar. A part of the metal from cutaway portion a is bent and shaped to form abutment 143b which prevents further upward movement of lever 146 under tension of spring 148. Lever 144 has a downward extension 144a, and lever 146 has a downward extension 146a, which is so bent as to extend underneath bars 142 and 143; and these downward extensions 144a and 146a are connected by the tension spring 148, which serves to hold both levers 144 and 146 in their elevated positions, with stop 145 in the path of movement of dog 140 and with stop 147 in the path of movement of both dogs 140 and 141. The tension of spring 148 at the same time affords the bias of bars 142 and 143 in opposite directions, as before described. It is necessary, since both stops 145 and 147 are in the line of movement of dog 140, that they may be simultaneously withdrawn from that line to permit tabulation movement of the carriage. Therefore, the lower edge of lever 146 is spaced above the edge of cutaway a in bar 143 to allow for sufficient downward movement. Stop 145 extends across bar 143 and over lever 146 so that when stop 145 is depressed it will engage lever 146 and depress it and stop 147 carried thereby. The upper edge of lever 146 is so sloped that, whatever may be the position of operating bar 142, full depression of stop 145 will also produce full depression of stop 147 regardless of the distance of stop 145 from the pivot of lever 146.

Preparatory to the typing of the work to be done, dogs 140 and 141 are set to determine the right and left margins of lines of maximum length. Preferably dog 140 is first set; and the setting is preferably near the center of the scale on the rack bar 139. Tabulating stop 130 also is set on tabulating bar 131 to determine the left margin of the column of justified lines (Fig. 26). It is to be observed that dog 140, near the end of the typing of the preliminary line, will come in contact with stop 145 and thereby move operating bar 142 to the right as the carriage moves in that direction. Bar 142 has at the left end a rack 125 which engages a pinion 126 on shaft 127 for the actuation of indicator 128 on dial 129 (Figs. 1 and 25). Pointer 128 and dial 129 enable the operator of the machine to observe the approach of the preliminary line toward its maximum length, after the warning given by the signal (usually a bell) just before stop 140 contacts stop 145 on operating bar 142.

Fig. 29 is a diagrammatic illustration of the operation of the carriage mechanism and the operating bar 142 on the justifying mechanism. After the warning signal the typist continues typing a few more characters. When dog 140 comes into contact with stop 145 the operating bar 142 is moved to the right a distance determined by the spacing allotted to the additional characters typed after stop 145 has been contacted by dog 140. Operating bar 142 is connected by a link 142a to an arm 151 that is rigidly fixed on hollow shaft 159, journalled in the machine frame 1. Hollow shaft 159 has rigidly fixed thereon a setting arm 158. Thus it is obvious that the movement of operating bar 142 occasioned by the typing of the few additional characters causes a clockwise movement of setting arm 158, the extent of which corresponds to the movement of operating bar 142. As before stated, the extent of this movement of operating bar 142 is disclosed by pointer 128.

The normal position of setting arm 158 is illustrated in Fig. 27 in which it is in the extreme limit of its counterclockwise position, from which it begins to move with the initial movement to the right of operating bar 142. Setting arm 158 has fixed thereon an extension 160, which is connected by link 161 to a slider 162 on proportion bar 235 (see Fig. 30). Slider 162 carries a roller 238; and it may be moved from a position on proportion bar 235 adjacent roller 237 on the end thereof, to a position in which roller 238 is coaxial with shaft 228, which is a pivot about which the proportion bar may oscillate.

In Fig. 27 the mechanism is in its inoperative position preparatory for setting by the mechanism described. In this position, control bar 124 (which regulates line justification) rests upon roller 237 but it does not rest upon roller 238, as is more clearly shown in Fig. 30. This is in order to leave slider 162 and roller 238 entirely free to move along proportion bar 235 during the setting operation that is to determine the amount of extension required to justify the typed line. During the typing of the few additional characters which occasion the clockwise movement of setting arm 158, as hereinbefore described, slider 162 will occupy a position on proportion bar 235 ranging from the position shown in Figs. 27 and 30 to a point where the axis of roller 238 is coaxial with shaft 228; for if in the typing of the preliminary line the completed line should happen to be of the exact length desired for the justified lines, operating bar 142 would have moved its full distance to the right, thereby moving, through setting arm 158, the roller 238 to its position coaxial with shaft 228. In such position of roller 238 no extension of the rewritten justified line would occur; but if the preliminary line should extend beyond the point of signal but less than the full length, the position of roller 238 on proportion bar 235 would determine the exact extension required to justify the line.

It should be observed that during the typing of the preliminary line, proportion bar 235 is supported in normal or horizontal position by latch 230 (Figs. 27 and 31). As will be later explained, when the preliminary line is completed and the carriage is tabulated to position for typing the justified line, latch 230 is released from proportion bar 235, and setting arm 158 is locked in the position to which it has been moved.

*Tabulation*

The tabulator key 110 (Fig. 26) is pivoted in the main frame at 132 so that when the key is depressed the back end of the lever is raised. A cross lever 191 is pivoted on bracket 192, which is secured to the main frame; and it bears upon the front arm 194 of lever 101. Lever 101 is pivoted on the main frame by shaft 193 to which it is rigidly fixed by sleeve 194a securely clamped thereon by set screws or otherwise. A spring 102 coiled about shaft 193 serves to exert an upward bias upon arm 194 of lever 101; and this upward bias is converted into downward bias on tabulating key lever 110, which is converted by pivot 132 into upward pressure at the tabulator fingerbutton marked TAB. Downward pressure on finger-button TAB obviously, through the intervention of levers 191 and 133, produces downward motion of rod 195 and of link or bar 135, and upward motion of link 103. Upward movement of link 103 acts upon tail 104 of dog 105 of escapement wheel I—f (Figs. 16 and 20), thereby permitting free rotation of that escapement wheel and of escapement shaft 41 and pinions 32, 33, 34 and 35 (Fig. 5), so that the carriage is free from the escapement mechanism; downward movement of bar 135 (Fig. 26) brings blocking lug 136 into the path of stop 130 on tabulator bar 131, and downward movement of rod 195 draws stops 145 and 147 down out of the path of dog 140. As a result of this movement of the tabulator key, the paper carriage moves to tabulating position for the beginning of the justified line.

Link 135 has at its upper end an opening 135a which receives arm 174 on the pivoted element 175 (Figs. 26 and 31). Element 175 is in the nature of a bell crank lever, having arms 176 and 177 for the actuation of rods 178 and 179. Rod 178 serves as a keeper to hold brake arm 181 in position against the tension of spring 182, rod 178 being projected by surrounding spring 180 into the path of movement of a lug 183 on pivoted arm 181. By referring to Fig. 32 it will be observed that brake arm 181 carries a roller 184 and a brake block 185 which is adapted to frictionally engage a curved surface 186 on setting arm 158, the surface being concentric with sleeve 159 (Fig. 25). It is obvious, therefore, that depression of tabulator key 110 not only releases the paper carriage for tabulation, but also, by lifting latch rod 178 (Figs. 26, 31 and 32), releases brake arm 181 to set the brake 185 on surface 186 of setting arm 158 to retain it in position, and thereby the determined position of roller 238 on proportion bar 235. By the same action arm 177 draws upon rod 179 to release latch 230 from proportion bar 235, so that, on tabulation, the machine is ready for the typing of the justified line.

It should be noted that latch 230 is biased toward its latching position by the tension of spring 231; and rod 179 is biased to permit latching by the tension of spring 187 which acts on rod 179 through pivoted lever 188. Pivoted lever 188 has a notch 189 for the latching of bell crank lever 190 in a position to be later described. Figs. 31 and 39 show the position of mechanism after operation of tabulator key 110.

*Line justification*

On writing the line in the tabulated column, if the preliminary line has not occupied the full allotted space, which is usually the case, the rewritten or justified line is expanded so that it occupies the full allotted space. To accomplish this, the paper carriage is given a controlled increment of motion in addition to that afforded to the carriage by the differential spacing mechanism.

According to the present invention, justification occurs only in the spaces between the words. When a preliminary unjustified line is written, the machine automatically determines the total amount of justification required to bring the line to standard length. This total amount is automatically divided into as many increments as there are spaces between words in the line. Then when the line is being rewritten as a justified line, one of these increments is added to each space between words in the line and the final result is a line of standard justified length.

The control devices by which this end is attained may be broadly described as follows: A distributor made of stepped element plates has a stepped plate for each space between words in a line. Thus, the first plate has one step for one space; the second plate has two steps for two spaces; the third plate has three steps for three spaces; and so on up to the fourteenth plate which has fourteen steps. (The number may be increased, but fourteen are deemed a sufficient number.) A single reader finger is adapted to coact with the plates of the distributor. When the preliminary line is being written, the reader finger is moved laterally over the distributor, one step each time the space bar is actuated. Thus, the first time the space bar is depressed, the reader finger moves opposite plate one of the distributor, and so on for each space in the line. If there are seven spaces in the line and the space bar is thus operated seven times, the reader finger will have moved laterally step by step until it stands at plate seven of the distributor. This plate has seven steps on its face. The line has been preliminary typed and the carriage movement has determined the total expansion needed to justify the line. The carriage is tabulated to the justified line column, and the line is being written in justified form. There is no lateral movement, at this time, between the reader finger and the distributor, but the reader finger has dropped on the first step of plate seven as the space bar registers the first space. This dropping of the finger has added one increment of movement to the normal space movement of the carriage. When the space bar operates to make the second space, the distributor turns to allow the reader finger to rest on the second step of the plate and thus a second increment is added to normal space carriage movement. This step-by-step rotation of the distributor continues, resulting in the reader finger reading each step of the seven steps on the plate seven, and each time adding the increment to the normal spacing so that when the line has been retyped it has become a justified line with the justification increments distributed in the spaces between the words.

It will be noted that there are two kinds of relative movement between the distributor and the reader finger. When the preliminary line is being written, the distributor is stationary and the reader finger moves laterally step by step to stand at all times opposite to the plate having as many steps as spaces have been made between the words that have been written.

When the justified line is being written, the distributor rotates step by step and the reader finger reads each step on the plate before which the finger stands at the conclusion of the unjustified preliminary line.

The first movement is a lateral selective movement and the second movement is a rotative reading movement.

The specific mechanism will now be described.

The carriage 16 (Figs. 28 and 29) has longitudinally slidable therein a rod 212, having at each end rigidly affixed an arm 214; and between arms 214 extends rack bar 31. Rack bar 31 is thereby pivotally supported by carriage 16, the pivot being rod 212; and since rod 212 is longitudinally slidable in carriage 16, the rack bar is capable of longitudinal motion relative to the carriage. Conversely stated, since the motion of rack bar 31 is controlled by the differential escapement mechanism, the carriage is capable of longitudinal motion relative to the rack bar; and it is this longitudinal motion of the carriage relative to the rack bar 31 that is utilized to produce the increment of expansion required for line justification. The carriage is connected to rack bar 31 by means of two bell crank levers 119, having downwardly extending arms 120 which have engagement with rack bar 31 between lugs 122 (see Fig. 28). Bell crank levers 119 have horizontal arms 121 which are connected at their ends with control bar 124.

It is to be observed that downward movement of control bar 124 occasions downward movement of horizontal arms 121, with consequent movement of carriage 16 to the right relative to rack bar 31, as viewed in Figs. 28 and 29. These figures being viewed from the rear of the machine thus disclose that downward motion of control bar 124 occasions additional movement of carriage 16 in the direction of normal carriage feed, under the influence of the carriage feed spring. Control bar 124, therefore, under the combined influence of the carriage spring and gravity, is biased toward downward movement; and it is this downward movement of control bar 124 that is utilized to control the additional spacing movement of carriage 16 required for justification of the typed line as it is being rewritten in the justified column.

As has been described already, control bar 124 moves parallel with the movement of carriage 16. During the preliminary typing the control bar rests upon roller 237 (Fig. 27) without any downward motion. Upon operation of the tabulator key 110 the support of roller 237 is withdrawn from the control bar (Fig. 32) and the latter is supported by an abutment consisting of roller 238, which has been moved to an adjusted position on proportion bar 235 (see Fig. 30). An important element of this invention is the provision of mechanism which will permit downward movement of the control bar 124 only on operation of space bar 70. To that end proportion bar 235 is pivotally supported by shaft 228 and is held against downward movement during the typing of the preliminary line by latch 230, and during the typing of printed characters in the justified line by a selector or supporting finger 225 (Fig. 32) which rests upon expansion distributor 234; but it is permitted to descend, step by step, during the typing of the justified line with each operation or depression of space bar 70, through its operation upon the expansion distributor as hereinafter described.

Fig. 27 shows the position of the control bar during the typing of the preliminary line and before there has been any setting of the justifying mechanism. It will be observed that slider 162 (which carries roller 238 for the support of control bar 124 after tabulation for the justified line) is in its extreme position near the end of proportion bar 235.

Fig. 23 shows the position of the mechanism during the typing of a justified line having five spaces between words, the space bar having been operated the second time. Roller 238 is in the adjuted position for the required increment in the length of the line; and expansion distributor 234 is acting to divide that increment into five steps, two of which have already been added.

The device whereby the required expansion of a line to accomplish justification is imparted only to the spacing between words, is the expansion distributor 234. Its structure will be more easily understood after explanation of the method of imparting the required expanding movement to the paper carriage. When the typed preliminary line has reached the point where the setting of lock arm 158 begins, as heretofore described, slider 162 and its roller 238 begin to move toward the right (Fig. 30). When the preliminary line is completed slider 162 will occupy a point ranging from the position shown in Fig. 30 to a point where the axis of roller 238 is coaxial with shaft 228. On operation of tabulator key 110, proportion bar 235 is released from latch 230 so that it may descend as permitted by expansion distributor 234, whereupon the end of finger 225 moves downward very slightly into contact with expansion distributor 234. The very slight increment of motion given to the paper carriage by this small initial drop of proportion bar 235 is immaterial, because it occurs at the beginning of every justified line, and therefore determines uniformly the starting point of every justified line.

If in the typing of the preliminary line the completed line should happen to be of the exact length desired for the justified lines, no increment would be required for the justified line; and roller 238 would have reached a position coaxial with shaft 228. Any downward motion of proportion bar 235 about the axis of shaft 228 would not affect the position of the coaxial roller 238; and hence no increment of motion would be imparted to the paper carriage by any downward motion of control bar 124. If, however, as is usually the case, the preliminary line should be shorter than the desired justified line, the position of roller 238 would correspond exactly to the degree of expansion required; and the downward movement of proportion bar 235 about the axis of shaft 228 would occasion a measured descent of roller 238 and control bar 124, with resulting increment of motion to the carriage (Fig. 32). This measured descent of proportion bar 235 is to be divided into as many parts as there are spaces between the words of the line, and is to be distributed to those spaces.

To accomplish such distribution there is provided an expansion distributor 234 (Figs. 34 and 40), which is a composite block having a plurality of distributing zones made up of a plurality of elements (fourteen as herein disclosed) of equal thickness and equal radial dimension. Each separate element is of different angular width and of different form, which includes a series of steps, and may be considered as arranged in its numerical order from 1 to 14, according to the number of steps it contains.

Each element is adapted to divide the required expansion increment, whatsoever it may be, into steps corresponding in number to its numbered position; thus element No. 1, having one step, allots the increment to a single space; element No. 2, having two steps, distributes the increment to two spaces; element No. 3, having three steps, expands the increment to three spaces, and so on, throughout the entire series of fourteen elements (Figs. 34 and 40). In Fig. 33 there is shown a view in section through expansion distributor 234 showing element No. 5, having five steps, which serves to distribute the expansion increment through five spaces between words. Fig. 35 shows element No. 8 having eight steps, adapted to divide the increment into eight spaces between words; and Fig. 36 shows element No. 14, adapted to divide the increment into fourteen spaces between words.

In addition to the fourteen elements mentioned, the expansion distributor includes a ratchet 234a, having fourteen teeth (Fig. 33). All these fourteen elements and the ratchet 234a have openings which, when assembled, are concentrically aligned to constitute a bore through the expansion distributor whereby it may be mounted on a shaft 233 for oscillation thereon; and they are all rigidly secured together en bloc by rivets, or otherwise, as may be desired.

For the support of expansion distributor 234 and other parts of the justifying mechanism, a bracket or shelf 200 (Figs. 37 and 40) is secured in any suitable way to the rear of the machine frame 1. Standards 201 and 202 (Fig. 34) are provided at the sides of shelf 200 for the support of pivot rod or shaft 228 secured to proportion bar 235 to support it for oscillation (Figs. 32 and 33). Standards 203 and 204 are also provided for the shaft 233 on which expansion distributor 234 is mounted. Expansion distributor 234 is biased by a spring 205 in a clockwise direction as viewed in Fig. 33, so that finger 206 on ratchet member 234a is held normally against pin 207.

Proportion bar 235 carries a movable selecting finger 225, so supported that when the proportion bar is latched in horizontal position the end of finger 225 is immediately over and slightly spaced from expansion distributor 234, as has been before stated; so that on operation of tabulator key 110 and release of latch 230, finger 225 rests directly upon expansion distributor 234. Thereafter, upon each depression of space bar 70, ratchet 234a is advanced one tooth against the action of spring 205, as a result of which finger 225 drops onto each successive step of the element of the expansion distributor, as will be described.

To provide for the operation described, proportion bar 235 has two rods 227 and 229 (Figs. 34, 33 and 41) rigidly secured perpendicular thereto by welding or otherwise in addition to rod 228; and these rods 227, 228 and 229 are connected at their ends opposite to bar 235 by a bar 236 (Fig. 34). Thus, proportion bar 235, bar 236 and rods 227, 228 and 229 constitute a frame journaled in standards 201 and 202. Mounted in this frame is the laterally slidable selecting finger 225 secured to hub 226 slidable on shaft 228. Finger 225 is guided in lateral motion not only by shaft 228 but also by rod 227, with which finger 225 is loosely engaged by a notch 227a (Figs. 33 and 32). Thus, finger 225, while laterally slidable along shaft 228, is retained during that lateral motion in definite angular relation to proportion bar 235; and conversely, proportion bar 235 is constrained to follow angular motion of finger 225 about the axis of shaft 228. In the position shown in Fig. 33 in which proportion bar 235 is supported by latch 230, finger 225 is positioned above and slightly spaced from distributor block 234. While proportion bar 235 is in its supported horizontal or normal position, finger 225 is out of contact with expansion distributor 234 and may be moved laterally; but upon operation of the tabulator key, as hereinbefore described, proportion bar 235 will be released from the supporting latch 230, and will descend slightly until finger 225 comes into contact with expansion distributor 234, after which finger 225 becomes a support for the proportion bar.

Thereafter, upon each depression of space bar 70, ratchet 234a is advanced against the yieldable resistance of spring 205 by suitable mechanism to be described, as a result of which advancement supporting finger 225, which is biased downwardly by spring 225q and the weight of bar 124 (Fig. 40), drops successively onto the steps of the element of distributor 234, with corresponding descent of proportion bar 235, control bar 124, and added increment to the spacing occasioned by depression of the space bar.

Upon making the last space in the justified line, finger 225 drops off of the last step of one of the distributor elements, e. g., element 234, and in so doing it moves ratchet-engaging member 250 counterclockwise sufficiently (Fig. 33) to disengage member 250 from ratchet 251b. This releases finger 225 for sliding return to its starting position under the action of finger 246, biased by spring 247. At this moment the distributor is held against movement due to the fact that the space bar is depressed. In moving into starting position, finger 225 moves laterally out of the path of all of the distributor elements, and upon release of the space bar, the distributor is released for return clockwise (Fig. 33), under the action of spring 205, to its starting position. Pin 207, being engaged by finger 206 of ratchet 234a, arrests the distributor in starting position.

For advancing ratchet 234a there is provided an oscillating pawl carrier 239 biased to the position shown by spring 239a and having a pivoted pawl 240 (Fig. 32). Standard 203 carries a stop 208 to prevent movement of pawl 240 so far as to advance the ratchet 234a more than a single step with each operation. Pawl carrier 239 is actuated by a push rod 241 resting upon shelf 200 and having extension 241a which extends through an opening in shelf 200. Oscillation is imparted by this link to the pawl carrier.

Shelf 200 has a wall 242 extending downward and shaped for attachment to the machine frame 1. The wall 242 has an opening 243 which serves as a bearing for shaft 93 journaled therein. Shelf 200 also has a bearing block 244 for supporting the opposite end of shaft 93, which shaft is longitudinally movable in its bearings as well as capable of oscillation about its axis. Shelf 200 is also provided with an elongated rectangular opening 245 through which a finger 94 extends from shaft 93. Finger 94 is fixedly secured on shaft 93 by a pin or otherwise. Shaft 93 has also rigidly secured thereto a finger 95, at substantially a right-angular relation to finger 94. Surrounding shaft 93 between finger 94 and wall 242 is a compression spring 96 which tends to move shaft 93 with its fingers 94 and 95 to the left, as viewed in Figs. 32 and 33. In this position finger 95 rests directly under the extension 241a of push rod 241, as shown in Fig. 39. It will be observed that on movement of rod 179 in the direction of the arrow, lever 188 is drawn against the tension of spring 187 so that notch 189 of lever 188 has been disengaged from bell crank lever 190 to permit it to yield to the biasing pressure of spring 96. As a result shaft 93 and its fingers 94 and 95 have moved to the left; and finger 95 is in position to lift push rod 241 on oscillation of shaft 93. In this position, however, finger 94 oscillates idly, since its path of movement is clear of pin 256, the function of which will be hereinafter described.

Referring to Fig. 40, it will be observed that rearward motion of spacer rod 70a is communicated through bell crank lever 90, link 91, arm 92, shaft 93 and finger 95 to push rod 241 (Fig. 39), which actuates pawl carrier 239 and pawl 240 to thereby advance ratchet 234a (Fig. 32) and expansion distributor 234 one step for each depression of the space bar 70. Thus, in the typing of the justified line, with each stroke of space bar 70 not only is the carriage given the normal advance of two units for each space but there is also added thereto a portion of the total required line extension for each space between words. This, however, presupposes that finger 225 has been moved over as many units of the distributor 234 as there are spaces between words in the preliminary unjustified line. The mechanism by which this is accomplished is also mounted on shelf 200.

Selecting finger 225 is biased toward the proportion bar 235 by the pressure of finger 246 (Fig. 34) under the tension of spring 247. It will be observed that sleeve 226 which carries finger 225 is slidable along shaft 228 against the pressure of finger 246; and that finger 246 is pivotally mounted on arm 248 which is rigidly affixed by welding or otherwise to rod 229. The sleeve 226 carries finger 225; but there is also a ratchet-engaging member 250 (Fig. 33) closely associated with finger 225 by which finger 225 may be given a step-by-step movement along shaft 228 by a ratchet device. Ratchet-engaging member 250 is yieldably connected to finger 225 in such manner that it normally moves in unison with finger 225 along shaft 228 and oscillates with finger 225 and proportion bar 235 about shaft 228. The ratchet-engaging member 250 has an arm or extension 250a (Fig. 34) which has a lug 250b extending under finger 225, against which it is held by the tension of spring 250c (Fig. 33). On return or resetting movement of proportion bar 235, the yieldable connection described avoids any injury to the ratchet or the engaging member by reason of resistance to relative movement between them. Ratchet-engaging member 250 is given intermittent movement by means of a ratchet device 251.

The ratchet device 251 is operated only during the typing of the preliminary line; as has been stated, finger 94 operates idly during the typing of the justified line, being shifted out of operating position by depression of the tabulating key. The ratchet device consists of two toothed ratchet elements 251a and 251b mounted upon bracket 200 (Figs. 33, 37 and 40), one of which, 251a, may be given a longitudinal reciprocating motion, the other, 251b, being restrained against such motion. Both these elements, however, are yieldably held in elevated position by yieldable resistance, such as spring 252a (Fig. 42) and spring 253 (Fig. 41), and are depressible against the action of such resistance. The ratchet elements are arranged side by side in guiding brackets 254, 255 as illustrated in Figs. 37 and 38. Guiding brackets 254 and 255 are mounted on the upper face of bracket or shelf 200 immediately beneath shaft 228, where they may be secured by screws or otherwise. Ratchet element 251a is shorter than element 251b by something more than the tooth spacing, both elements having uniform tooth spacing. Ratchet element 251a is supported in elevated position by spring 252a (see Fig. 42). Ratchet element 251b is supported in elevated position by spring 253 (see Fig. 41).

As viewed in Figs. 33 and 34, ratchet element 251a is biased toward the ratchet-engaging element 250 by the tension of spring 252 which extends from standard 201 to a pin 256 on ratchet element 251a.

Ratchet element 251b is restrained against longitudinal movement by the upstanding abutments 254a and 255a (Fig. 38) of guide brackets 254 and 255, respectively. The brackets 254 and 255, respectively, have openings 254b and 255b within which ratchet elements 251a and 251b are placed side by side, and which permit of the particular movements those elements are required to undergo. Ratchet element 251a is given reciprocating motion by oscillation of finger 94 on shaft 93 (Fig. 33) against pin 256 on ratchet element 251a; and the oscillation of finger 94 is caused by the oscillation of shaft 93 imparted by depression of space bar 70 and reciprocation of spacer rod 70a, which in turn is communicated through bell crank lever 90, link 91 and arm 92 on shaft 93 (see Fig. 40). Referring to Fig. 40, it will be seen that counterclockwise movement of finger 94, by contacting pin 256, moves ratchet element 251a to the left. Clockwise movement permits return of element 251a under the tension of spring 252. From this it is obvious that depression of the space bar 70 results in giving motion to ratchet element 251a to the left as viewed in Fig. 40. This motion is communicated to ratchet-engaging element 250, which, in its motion to the left presses downward ratchet element 251b against the action of spring 253. Thus, with each depression of space bar 70 selecting finger 225 (Fig. 40) is carried one step to the left, as viewed in that figure, by element 251a, and retained in the advanced position by element 251b (which does not reciprocate) against the pressure of finger 246 (Fig. 34). Since finger 225 during this motion does not contact expansion distributor 234, the only frictional resistance to the step-by-step motion of sleeve 226 is the friction of sleeve 226 on shaft 228 and the friction of finger 225 on rod 227, which is practically negligible.

*Carriage return*

When the typing of the justified line has been completed, the carriage is ready for restoration to position for typing the next preliminary line. As has been previously described, finger 225 returns to initial position upon the making of the last space in the justified line. However, there may be occasions when the last space of the justified line is not reached, as when the operator makes an error in the first few words of the preliminary line and thereupon restores the carriage to starting position in order to start the typing of the preliminary line over again. In such a case the finger 225 is restored to initial position by return of the carriage to starting position, as will be described presently.

On return of the carriage, stop 147, which is carried by restoring bar 143, is contacted by dog 141 on rack 139 and the restoring bar is carried to the left as viewed in Figs. 25 and 30. This motion, acting through link 143a, turns shaft 152 in counterclockwise direction; which motion is communicated to arms 153 and 154. Arm 153 has secured on one side a cam block 153a, which during the counterclockwise motion contacts roller 184 on brake arm 181, thereby pushing the brake arm to the left until rod 178, under the action of spring 180, is projected into the return path of lug 183 on arm 181 to hold the latter in position. This motion of brake arm 181 acts to release brake block 185 from contact with surface 186 on lock arm 158, and at the same time increases the tension on spring 182 between brake arm 181 and lock arm 158. In addition to this, the leftward movement of restoring bar 143 has increased the tension on spring 148, which increased tension acts to restore operating bar 142 also to its leftward position. The leftward movement of operating bar 142 acts through hollow shaft 159 to aid in returning locking arm 158 to the position shown in Fig. 27.

The counterclockwise motion of arm 153 also brings cam end 153b on arm 153 (Fig. 32) into contact with roller 156 on the end of bar 157, pivoted at 157a to the downward extending bend 235a on proportion bar 235. Bar 157 is held in substantially right-angled relation to proportion bar 235 by the tension of spring 157b between rod 229 and the upper end of bar 157. This tension draws the upper end of bar 157 toward bar 229 until pin 157c contacts the bend portion 235a of the proportion bar 235. On contact of cam 153b with roller 156, bar 157 and proportion bar 235 are given clockwise motion about the axis of shaft 228 until the proportion bar takes the position shown in Fig. 27. In this position latch 230 engages proportion bar 235 to retain it in the position shown until again released through the agency of tabulator key 110 (Fig. 26).

By reference to Figs. 37 and 41, it will be seen that a yoke 257 is pivotally mounted on shaft 228; and this yoke is connected by link 259 with the upper end of bar 157 (which is pivotally mounted below the bend portion 235a of proportion bar 235). Arm 153 is of such length that cam 153b after moving roller 156 and bar 157 sufficiently to restore proportion bar 235 to its horizontal position, continues the motion, so that spring 157b yields and link 259 acts to draw yoke 257 in a clockwise direction as viewed in Fig. 41. Yoke 257 is provided with two cams 258 (Figs. 37 and 41) which by the said clockwise motion act to depress ratchet elements 251a and 251b out of engagement with ratchet-engaging element 250 (Figs. 33, 37 and 40), thus releasing finger 225 for restoration to initial position by the pressure of finger 246 which is biased by spring 247. In its initial position finger 225 is nearest to proportion bar 235, which is the position preparatory to the typing of the next preliminary line.

To permit the finger 225 to move freely into initial position under all angular positions of the distributor, element No. 0 and element No. 1 thereof are shaped as shown in Fig. 35a so that, with finger 206 against pin 207 (Fig. 33), there will be sufficient clearance for the lateral movement of finger 225 into the No. 0 position. Upon elevation of finger 225, as previously described, it engages arm 225t of the No. 0 element, thereby camming the distributor backwards slightly (against the bias of spring 205) until finger 225 has been raised sufficiently to permit the end of arm 225t to move under the nose of arm 225 as indicated in connection with the dot-dash showing of Fig. 35a.

As has been already stated, the paper carriage 16 is longitudinally movable relative to escapement rack 31 (Fig. 29). Return movement of carriage 16, therefore, operates first to elevate control bar 124 through restoration of proportion bar 235 to its highest position. This elevation of control bar 124 after restoring the relative position of carriage 16 relative to rack 31, is arrested when it comes into contact with roller 237a carried by standard 203 (Figs. 34 and 40). The carriage spring thereafter produces an initial movement of carriage 16 in the direction of its normal feed as soon as the force is relaxed that is used to return the carriage, which initial movement places the carriage at the position required for the beginning of the new preliminary line; and such initial movement imparts to cam 153b (Fig. 32) motion in a clockwise direction, which permits restoration of arm 157 to its normal position relative to proportion bar 235, when yoke 257 and cams 258 (Figs. 37 and 41) are oscillated in anti-clockwise direction, so that ratchet device 251 is restored to active position in mesh with element 250 by springs 252a and 253.

Return of carriage 16 to position for beginning the new preliminary line, with resulting counter-clockwise motion of arm 154, causes movement of rod 155 to the left (Fig. 25). The effect of this movement of rod 155 is indicated in Fig. 39, which is a view from above of mechanism beneath shelf 200 for communicating motion from space bar 70 to the justifying control devices. As before stated, during the typing of the justified line, shaft 93 is in the position shown in Fig. 39 with finger 95 directly in alignment with link 241 and its projection 241a, whereby oscillation of shaft 93 produces the step-by-step oscillation of expansion distributor 234, but has no effect on ratchet device 251, since when shaft 93 is in that position finger 94 does not in its oscillation come into contact with pin 256 on ratchet element 251a but moves idly past it. Movement of rod 155 to the left, however, oscillates bell crank lever 190 in a counterclockwise direction, thereby pushing shaft 93 to the right, in which position it is held by the action of notch 189 on bell crank lever 190 to prevent return movement of shaft 93 under the pressure of spring 96. In this position of shaft 93, finger 95 oscillates idly while finger 94 acts on ratchet element 251a, as has heretofore been described, to impart step-by-step movement of finger 225 in response to the successive depressions of space bar 70.

It is to be noted that depression of spacing key SP does not communicate motion in any way to the justifying mechanism.

*Carriage adjustments*

As has been already explained, the dogs 140 and 141 (Fig. 25) are set on rack 139 according to the positions of the right-hand and left-hand margins of the typed page, which determine the length of the lines. The carriage having been placed at initial position preparatory to the typing of the preliminary line, the pointer 20 (Figs. 3, 3a, and 1) is manually set to coincide with the index mark 20b' which is on dial 20b. As the preliminary line is typed, pointer 20 will move clockwise progressively and it will make a further increment of clockwise movement upon tabulation to bring the carriage into position for the beginning of the justified line. When the carriage has been brought to proper position for the beginning of the justified line, bezel 20g is set manually to bring its index 20c into coincidence with the position then occupied by pointer 20.

Before beginning to type each succeeding preliminary line, the operator should observe whether the carriage is in proper initial position, as indicated by the relation of pointer 20 to index mark 20b'. If it should be found that the pointer 20 does not coincide with index mark 20b', then the carriage should be brought to such position that it does coincide. This can be done by operation of spacing key SP or back-spacing key 3 as may be required, without having any effect on the justifying mechanism, which can be acted upon at this part of the line only by space bar 70.

Before beginning to type each succeeding justified line, the operator should make certain that the carriage is in proper position, as indicated by the relation of bezel index 20c with pointer 20. If bezel index 20c does not coincide with pointer 20, the position of the carriage should be so adjusted that it does coincide. This can be done by the operation of spacing key SP or back-spacing key 3 as may be required.

From the foregoing it will be observed that while the mechanism disclosed is illustrated in connection with a shuttle type of typewriting machine, it is primarily directed to improvements in line justification and in adaptation to the use of type of different styles and systems of spacing, and is therefore capable of association with any other kind of printing mechanism operative in a typewriting machine.

I claim:

1. In a justifying typewriting machine, a movable paper carriage, an escapement rack on said paper carriage, a control bar mounted on said carriage for movement therewith, a connection between said control bar, said carriage and said rack whereby movement of said control bar relative to said carriage causes movement of said carriage relative to said rack, spacing control means, variable escapement mechanism controlled by said spacing control means for controlling the movement of said carriage, a pivoted proportion bar, an abutment slidably mounted on said proportion bar, means for moving said abutment to an adjusted position on said proportion bar in response to carriage movement, means for securing said abutment in adjusted position, means for biasing said control bar against said abutment to cause angular movement of said proportion bar, means for controlling the angular movement of said proportion bar and said abutment by said spacing control means, and means operable by carriage return for causing return movement of said proportion bar.

2. In a justifying typewriting machine, in combination, a movable paper carriage, an escapement rack on said carriage, means adapted to cause relative movement between said carriage and said rack, escapement mechanism for controlling said carriage and said rack, a pivoted proportion bar, means actuated by carriage movement beyond a fixed point for determining the effective length of said proportion bar, ratchet means for imparting step-by-step angular movement to said proportion bar during the typing of a justified line, a space bar, a connection from said space bar to said ratchet means for actuating said ratchet means on operation of said space bar, and a connection from said proportion bar to said means for causing relative movement between said carriage and said rack, whereby the required increment of movement for line justification is imparted to said carriage.

3. In a justifying typewriting machine, a movable paper carriage, an escapement rack on said carriage, means adapted to cause relative movement between said carriage and said rack, escapement mechanism for controlling the movement of said carriage and said rack, means actuated by carriage movement beyond a fixed point for determining the increment of carriage movement required for line justification comprising an adjustable pivoted arm, a pivoted proportion bar, a roller mounted for slidable movement along said proportion bar, a connection from said pivoted arm to said roller, ratchet means for imparting step-by-step angular movement to said proportion bar during the typing of a justified line, a space bar, a connection from said space bar to said ratchet means for actuating said ratchet means on operation of said space bar, and a connection from said roller to said means for causing relative movement between said carriage and said rack, whereby the required increment of movement for line justification is imparted to said carriage.

4. In a justifying typewriting machine, a movable paper carriage, an escapement rack on said carriage, means adapted to cause relative movement between said carriage and said rack, a space bar, means actuated by carriage movement beyond a fixed point for determining the increment of carriage movement required for line justification comprising a pivoted arm, a pivoted proportion bar, a roller mounted for slidable movement along said proportion bar, a connection from said pivoted arm to said roller, a pivoted stepped expansion distributor, means for biasing said proportion bar toward said expansion distributor, a finger resting upon said expansion distributor and supporting said proportion bar, a ratchet secured on said expansion distributor, means for imparting step-by-step angular movement by means of said space bar and said ratchet to said expansion distributor, whereby said finger and said proportion bar move step by step as permitted by movement of said expansion distributor, and a connection from said roller to said means for causing relative movement between said carriage and said rack, whereby the required increment of movement for line justification is imparted to said carriage.

5. In a justifying typewriting machine, a movable paper carriage, an escapement rack on said carriage, means adapted to cause relative movement between said carriage and said rack, a space bar, carriage escapement mechanism, justifying mechanism comprising a pivoted lock-arm, a lock for holding the lock-arm in any adjusted position, a pivotally mounted proportion bar, a latch for retaining the proportion bar in normal position, a slidable abutment mounted on the proportion bar, a link connecting the slidable abutment and the lock-arm for adjusting the abutment along the proportion bar, means actuated by movement of the carriage beyond a fixed point for adjusting the pivoted lock-arm, and thereby the abutment, to a position adapted to effect the increment of carriage movement required for line justification, an expansion distributor having a plurality of distributing zones, means for biasing the proportion bar and the adjustable abutment thereon for angular movement toward the expansion distributor, a supporting finger pivoted coaxially with the pivot of the proportion bar and in fixed angular relation thereto, the finger being movable laterally relative to the proportion bar over the various zones of the expansion distributor, a device for interposing a yieldable resistance to such lateral movement of the supporting finger, means for moving said finger laterally against such resistance on each operation of the space bar, means for imparting intermittent pivotal movement to the expansion distributor by each operation of the space bar, tabulator mechanism for causing the carriage to move to tabulation position for typing justified lines, means controlled by the tabulator mechanism for locking the lock-arm, for shifting the operative connection of the space bar from the supporting finger to the expansion distributor, and for releasing the latch for the proportion bar, whereby each depression of the space bar imparts movement to the expansion distributor with resulting movement of the proportion bar and slidable abutment, and an operative connection between said abutment and the means to cause relative movement between the carriage and the rack, whereby the justification increment is distributed to the spaces between the words.

6. A device according to claim 5 in which the means for moving said finger laterally comprises a ratchet consisting of two horizontal racks having laterally-coincidental serrated teeth, and being depressible against yieldable resistance, one of said racks being restrained against horizontal movement and the other of said racks being movable horizontally against spring tension, an engaging member associated with said finger engaging said racks, and an operative connection between said space bar and said movable rack whereby depression of the space bar causes reciprocation of the movable rack.

7. A device according to claim 5 in which the expansion distributor comprises a spring-biased block of flat elements of equal radial dimension secured rigidly together for oscillation about a common axis, each element having an operative side of increasing angular dimension radially inward, the maximum angular dimension of each successive element increasing unit by unit in order of axial arrangement, and an arcuate ratchet having teeth spaced unit-angular distance apart secured in rigid relation to said block.

8. In a justifying typewriting machine, in combination, a movable paper carriage, printing keys, differential escapement mechanism actuated by said printing keys for controlling the escapement of said carriage in accordance with the width of printing characters, a space bar, means actuated by said space bar for imparting a definite escapement movement to said carriage on each actuation of the space bar, justifying mechanism comprising an expansion distributor having a plurality of distributing zones, a selecting finger movable over said distributing zones, a step-by-step ratchet device operative to move said selecting finger over said distributing zones, an operative connection between said space bar and said ratchet device whereby the selecting finger is adjusted by operation of the space bar, normally inactive means for imparting step-by-step movement to the expansion distributor by operation of the space bar, a tabulating device, means controlled by said tabulating device for shifting the operating connection of the space bar from said ratchet device to the means for imparting step-by-step movement to the expansion distributor, and means for moving said paper carriage the proper increment for line justification upon each step-by-step movement of the expansion distributor whereby the required justifying expansion is distributed only to carriage movements imparted by the space bar.

9. In a justifying typewriting machine, in combination, a movable paper carriage, printing keys, escapement mechanism actuated by said printing keys for controlling the movement of said carriage, a space bar, means actuated by said space bar for imparting escapement movement to said carriage on each actuation of the space bar, justifying mechanism comprising an expansion distributor having a plurality of distributing zones, a selector movable over said distributing zones, a device operative to move said selector step by step over said distributing zones, an operative connection between said space bar and said device whereby the selector is actuated by operation of said space bar, normally inactive means for imparting step-by-step movement to the expansion distributor by operation of said space bar, a tablulating device, means controlled by said tabulating device for shifting the operative connection of the space bar from said device to the means for imparting step-by-step movement of the expansion distributor, and means for moving said paper carriage the proper increment for line justification upon each step-by-step movement of the expansion distributor whereby the required justifying expansion is distributed to carriage movements imparted only by said space bar.

10. In a justifying typewriting machine, a movable paper carriage, an escapement rack on said carriage, means for causing relative movement between said carriage and said escapement rack, a space bar, justifying mechanism comprising a pivoted proportion bar, a slidable abutment mounted on said proportion bar, means actuated by movement of the carriage beyond a fixed point for adjusting the abutment to a position adapted to effect an increment of carriage movement to afford expansion for line justification, an expansion distributor having a plurality of distributing zones, means for biasing the proportion bar and the adjustable abutment thereon for angular movement toward the expansion distributor, a selector movable angularly with the proportion bar and laterally thereof over the various zones of the expansion distributor, means offering a yieldable resistance to such lateral movement of the selector, means for moving the selector against said yieldable resistance on operation of the space bar, means for imparting step-by-step movement to the expansion distributor by operation of the space bar, tabulator mechanism for causing the carriage to move to tabulation position for typing justified lines, and means controlled by the tablulator mechanism for shifting the operative connection of the space bar from the selector to the expansion distributor, whereby each actuation of the space bar after operation of the tabulator mechanism imparts movement to the expansion distributor with resulting movement of the proportion bar and the slidable abutment thereon, and an operative connection between said abutment and the means for causing relative movement between the paper carriage and the escapement rack, whereby the justification increment is distributed to the spaces between the words.

11. In a justifying typewriting machine, in combination, a movable paper carriage, printing keys, escapement mechanism actuated by the printing keys for controlling the movement of the carriage during printing operations, a space bar, means actuated by said space bar for imparting a definite escapement movement to said carriage on the actuation of said space bar, justifying mechanism for imparting an increment of carriage movement to normal carriage movement imparted by said space bar, said justifying mechanism comprising a distributor formed of a series of stepped element plates having a stepped plate for each space between words in a line, a reader finger adapted to coact with the plates of said distributor, means operatively connected with the space bar to cause said finger to move laterally over said distributor to select a stepped plate when a non-justified line is being written, means for rotating said distributor step by step for each space between words in a justified line, means to cause said reader finger to contact each step on said selected plate of said distributor each time said space bar is actuated between the words comprising a justified line, and means for moving said paper carriage the proper increment for line justification upon each step-by-step movement of the reader finger.

12. In a justifying typewriting machine, in combination, a movable paper carriage, printing keys, escapement mechanism actuated by the printing keys for controlling the movement of the carriage during printing operations, a space bar, means actuated by said space bar for imparting a definite escapement movement to said carriage on the actuation of said space bar, justifying mechanism, said justifying mechanism comprising a distributor formed of a series of stepped element plates having a stepped plate for each space between words in a line, each plate having as many steps thereon as the numbered position of the plate in the series, a reader finger adapted to coact with the plates of said distributor, means operatively connected with the space bar to cause said finger to move laterally over said distributor to select a stepped plate when a non-justified line is being written, means for rotating said distributor step by step for each space between words in a justified line, means to cause said reader finger to contact each step on said selected plate of said distributor each time said space bar is actuated between the words comprising a justified line, and means for moving said paper carriage the proper increment for line justification upon each step-by-step movement of the reader finger.

13. In a justifying typewriting machine, in combination, a movable paper carriage, printing keys, escapement mechanism actuated by the printing keys for controlling the movement of the carriage during printing operations, a space bar, means actuated by said space bar for imparting a definite escapement movement to said carriage on the actuation of said space bar, justifying mechanism for imparting an increment of carriage movement to normal carriage movement imparted by said space bar, said justifying mechanism comprising a distributor formed of a series of stepped element plates having a stepped plate for each space between words in a line, a reader finger adapted to coact with the plates of said distributor, means operatively connected with the space bar to move said finger laterally over said distributor when a non-justified line is being written, means for rotating said distributor step by step for each space between words in a justified line, means to cause said reader finger to contact each step on a selected plate of said distributor each time said space bar is actuated between words comprising a justified line, and means to cause a predetermined justifying increment to be imparted to said normal carriage movement each time said reader finger contacts said step.

14. In a justifying typewriting machine, a movable paper carriage, escapement mechanism for controlling the movement of said carriage, a space bar, a pivotally mounted proportion bar, means operatively connected with the proportion bar for determining and setting the effective length thereof in accordance with the space to be justified, means to impart to the proportion bar a step-by-step rotary motion upon each operation of the space bar in typing a justified line, moving the proportion bar through a fixed angular distance for each line typed, and means actuated by the proportion bar upon each step-by-step movement thereof for producing the required increment of movement of the carriage for line justification.

15. In a justifying typewriting machine, a movable paper carriage, escapement mechanism for controlling the movement of said carriage, a space bar, a pivotally mounted proportion bar, means operatively connected with the proportion bar for determining and setting the effective link thereof in accordance with the space to be justified, means determined by operation of the space bar in typing an unjustified line for imparting to the proportion bar a step-by-step rotary movement upon each operation of the space bar in typing the justified line and a fixed angular movement for each line typed, and means actuated by the proportion bar upon each step-by-step movement thereof for producing the required increment of movement of the carriage for line justification.

16. In a justifying typewriting machine, a movable paper carriage, escapement mechanism for controlling the movement of said carriage, a space bar, a pivotally mounted proportion bar, means operatively connected with the proportion bar for determining and setting the effective length thereof in accordance with the space to be justified, means for maintaining the proportion bar in normal position during typing of an unjustified line, means determined by operation of the space bar in typing an unjustified line for imparting to the proportion bar a step-by-step rotary movement upon each operation of the space bar in typing the justified line and a fixed total angular movement for each line typed, and means actuated by the proportion bar upon each step-by-step movement thereof for producing the required increment of movement of the carriage for line justification.

17. In a justifying typewriting machine, a movable paper carriage, escapement mechanism for controlling the movement of said carriage, a space bar, a pivotally mounted proportion bar, means operatively connected with the proportion bar for determining and setting the effective length thereof in accordance with the space to be justified, means for maintaining the proportion bar in normal position during typing of an unjustified line, means determined by operation of the space bar in typing an unjustified line for imparting to the proportion bar a step-by-step rotary movement upon each operation of the space bar in typing the justified line and a fixed total angular movement for each line, means actuated by the proportion bar upon each step-by-step movement thereof for producing the required increment of movement of the carriage for line justification, and means for restoring the proportion bar to normal position upon return of the paper carriage.

18. In a justifying typewriter, a movable paper carriage, escapement mechanism for controlling the movement of said carriage, operating controls, a pivotally mounted lever, means operatively connected with said lever for determining and setting the effective length thereof in accordance with the space to be justified, means to impart to the lever a step-by-step rotation upon each operation of a particular operating control, moving the lever through a fixed angular distance for each justified line typed, and means actuated by the lever upon each step-by-step movement thereof for producing an increment of carriage movement for line justification.

19. A justifying typewriting machine for expanding a line during typing by increasing only the spacing between words, comprising a movable paper carriage, escapement mechanism for controlling the movement of said carriage, a space bar, a pivotally mounted proportion bar extending, before typing a justified line, parallel with the direction of carriage movement, means for setting the effective length of said proportion bar in accordance with the space to be justified, means to impart to the proportion bar a step-by-step movement upon each operation of the space bar in typing a justified line, moving the proportion bar through a fixed angular distance for each line typed; and means moving with the carriage and actuated by the proportion bar upon each step-by-step movement thereof for producing the required increment of movement of the carriage for line justification.

20. A justifying typewriting machine as claimed in claim 19, in which means actuated upon return movement of the carriage for typing a new line restores the proportion bar to position parallel with the direction of carriage movement.

CHARLES W. NORTON.

(References on following page)

REFERENCES CITED

The following references are of record in the file of this patent:

UNITED STATES PATENTS

| Number | Name | Date |
|---|---|---|
| 510,305 | Watson | Dec. 5, 1893 |
| 1,186,216 | Marek | June 6, 1916 |
| 1,415,138 | Bates | May 9, 1922 |
| 1,918,304 | Trego | July 18, 1933 |
| 2,213,562 | Dodge | Sept. 3, 1940 |
| 2,220,184 | Waite et al. | Nov. 5, 1940 |
| 2,263,642 | Norton | Nov. 25, 1941 |
| 2,298,805 | Norton | Oct. 13, 1942 |
| 2,322,222 | Colton | June 22, 1943 |
| 2,348,261 | Nicks | May 9, 1944 |
| 2,350,561 | Lake | June 6, 1944 |

Certificate of Correction

March 29, 1949.

Patent No. 2,465,657.

CHARLES W. NORTON

It is hereby certified that errors appear in the printed specification of the above numbered patent requiring correction as follows:

Column 2, line 39, for the word "indexing" read *indicating*; column 5, line 7, for "Tgero" read *Trego*; column 19, line 36, for "Fig. 23" read *Fig. 32*; line 40, for "adjuted" read *adjusted*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*